(12) United States Patent
Hasegawa et al.

(10) Patent No.: US 8,724,925 B2
(45) Date of Patent: May 13, 2014

(54) MISALIGNMENT DETECTING APPARATUS, MISALIGNMENT DETECTING METHOD, AND COMPUTER PROGRAM PRODUCT

(75) Inventors: Fumihiro Hasegawa, Tokyo (JP); Hitoshi Itoh, Kanagawa (JP); Mitsuyoshi Mineyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1510 days.

(21) Appl. No.: 11/717,125

(22) Filed: Mar. 13, 2007

(65) Prior Publication Data

US 2007/0230825 A1    Oct. 4, 2007

(30) Foreign Application Priority Data

Mar. 31, 2006  (JP) ................................. 2006-099492
Jan. 19, 2007  (JP) ................................. 2007-010737

(51) Int. Cl.
*G06K 9/32* (2006.01)

(52) U.S. Cl.
USPC ............................ 382/294; 382/218; 382/258

(58) Field of Classification Search
USPC .................... 382/218–221, 258, 294
See application file for complete search history.

(56) References Cited

U.S. PATENT DOCUMENTS

| 5,712,921 | A  | * | 1/1998 | Zabele ........................... 382/112 |
| 5,920,658 | A  |   | 7/1999 | Yamagata et al. |
| 6,022,144 | A  | * | 2/2000 | Hausslein ........................ 383/33 |
| 6,022,154 | A  |   | 2/2000 | Allen |
| 6,181,820 | B1 | * | 1/2001 | Tachikawa et al. ............ 382/190 |
| 8,090,192 | B2 | * | 1/2012 | Mitsui ........................... 382/151 |

| 2002/0025081 | A1 |   | 2/2002  | Kumazawa |
| 2003/0020833 | A1 | * | 1/2003  | Akiyoshi et al. ............... 348/578 |
| 2005/0168582 | A1 | * | 8/2005  | Stuckler ...................... 348/208.2 |
| 2005/0180645 | A1 |   | 8/2005  | Hasegawa et al. |
| 2005/0201624 | A1 |   | 9/2005  | Hara et al. |
| 2005/0225787 | A1 |   | 10/2005 | Yonaha |
| 2006/0119823 | A1 | * | 6/2006  | Hirukawa et al. ............... 355/55 |
| 2006/0170979 | A1 |   | 8/2006  | Hasegawa et al. |
| 2006/0171595 | A1 |   | 8/2006  | Hasegawa et al. |
| 2006/0177151 | A1 |   | 8/2006  | Miyazawa et al. |
| 2007/0031002 | A1 | * | 2/2007  | Venkatesh et al. ............. 382/103 |
| 2007/0047777 | A1 | * | 3/2007  | Adachi et al. .................. 382/124 |
| 2007/0206881 | A1 | * | 9/2007  | Ashikaga ...................... 382/294 |

FOREIGN PATENT DOCUMENTS

| CN | 1565000 A   | 1/2005 |
| EP | 1-213-917   | 6/2002 |
| JP | 60-156185 A | 8/1985 |
| JP | 62-93768 A  | 4/1987 |

(Continued)

OTHER PUBLICATIONS

An image registration technique for recovering rotation, scale and translation parameters, McGuire, Feb. 19, 1998.*

(Continued)

*Primary Examiner* — Aaron W Carter
(74) *Attorney, Agent, or Firm* — Dickstein Shapiro LLP

(57) ABSTRACT

A correction-coefficient calculating unit calculates a correction coefficient to correct misalignment between a first print image and a second print image. A correcting unit corrects the first print image based on the correction coefficient to obtain a corrected first image. A pixel-value determining unit assigns a pixel value based on pixel-value matching state at corresponding positions in the corrected first image and the second print image. An image generating unit generates a misalignment display image from the corrected first image and the second print image that is assigned a predetermined pixel value. An output unit that outputs the misalignment display image.

12 Claims, 30 Drawing Sheets

(56) References Cited

FOREIGN PATENT DOCUMENTS

| | | |
|---|---|---|
| JP | 3-246691 A | 11/1991 |
| JP | 8-194819 A | 7/1996 |
| JP | 2002-74367 A | 3/2002 |
| JP | 2003-099021 | 4/2003 |
| JP | 2004-326821 A | 11/2004 |
| JP | 3636809 | 1/2005 |
| JP | 2005-033656 | 2/2005 |
| JP | 2005-197792 A | 7/2005 |

OTHER PUBLICATIONS

European Search Report.

\* cited by examiner

| CORRECTED FIRST IMAGE \ SECOND PRINT IMAGE | BLACK | WHITE |
|---|---|---|
| BLACK | GREEN | YELLOW |
| WHITE | RED | WHITE |

FIG. 6
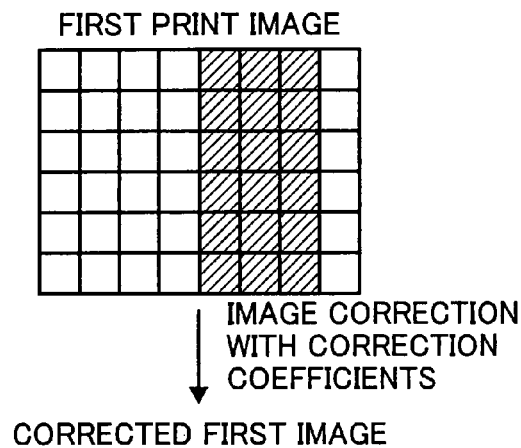
FIRST PRINT IMAGE
↓ IMAGE CORRECTION WITH CORRECTION COEFFICIENTS
CORRECTED FIRST IMAGE
FIG. 7
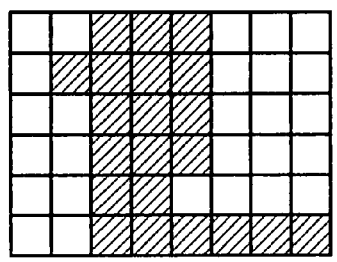
CORRECTED FIRST IMAGE
SECOND PRINT IMAGE
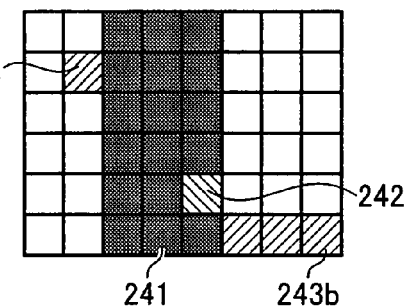
MISALIGNMENT DISPLAY IMAGE
243a
242
241   243b IMAGE ID ○○
MISALIGNMENT AMOUNT x:_____ , y:_____

FIG. 20A
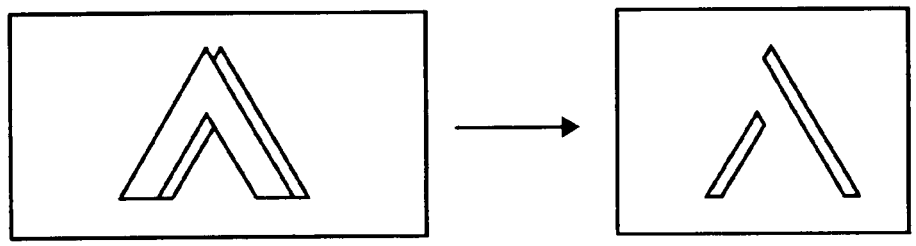
FIG. 20B
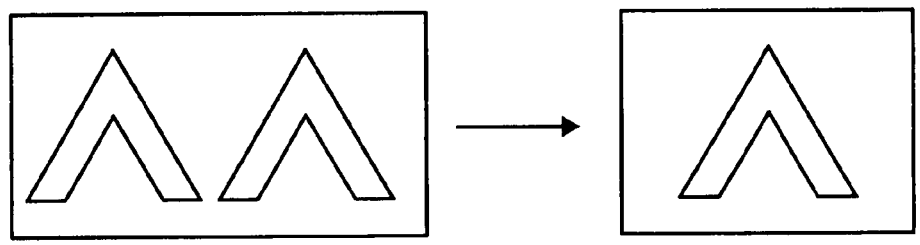
FIG. 21
IMAGE ID ○○   DEGREE OF DIFFERENCE ▭

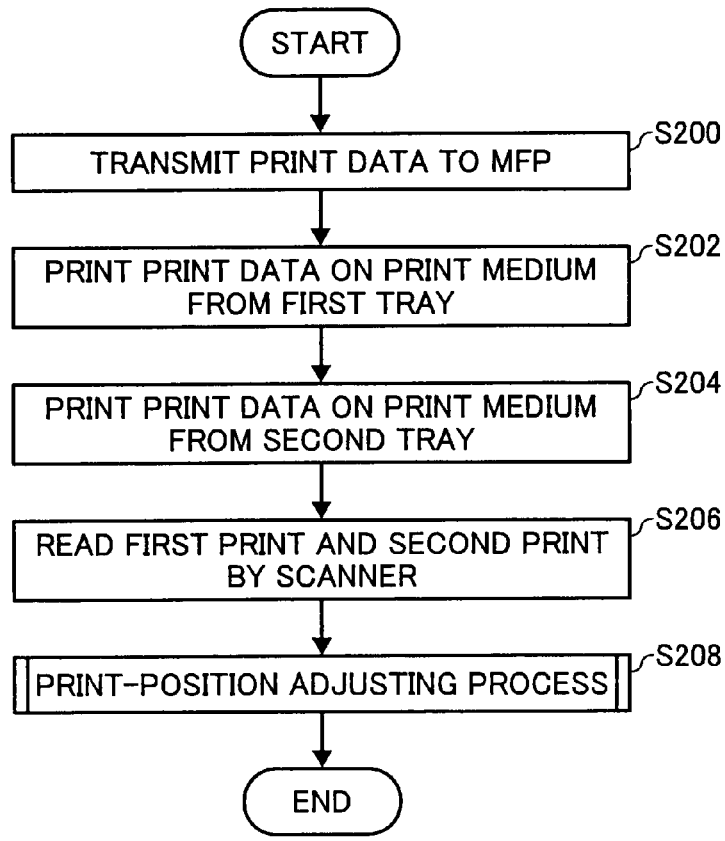
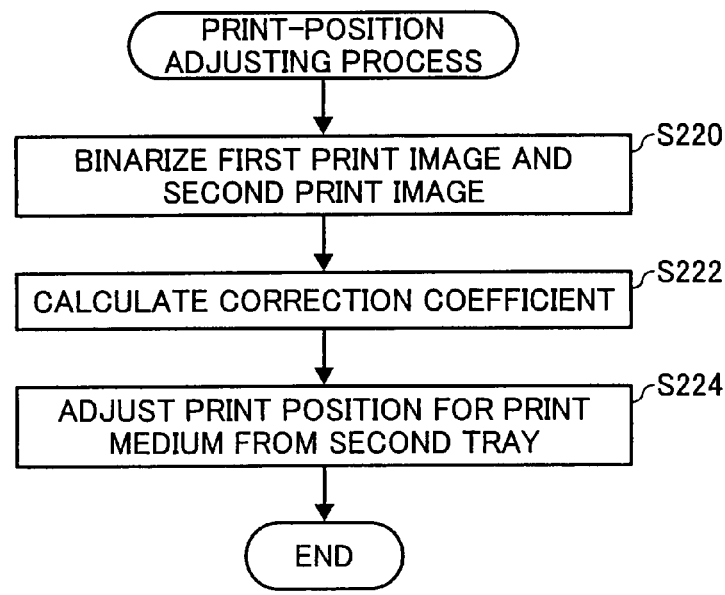

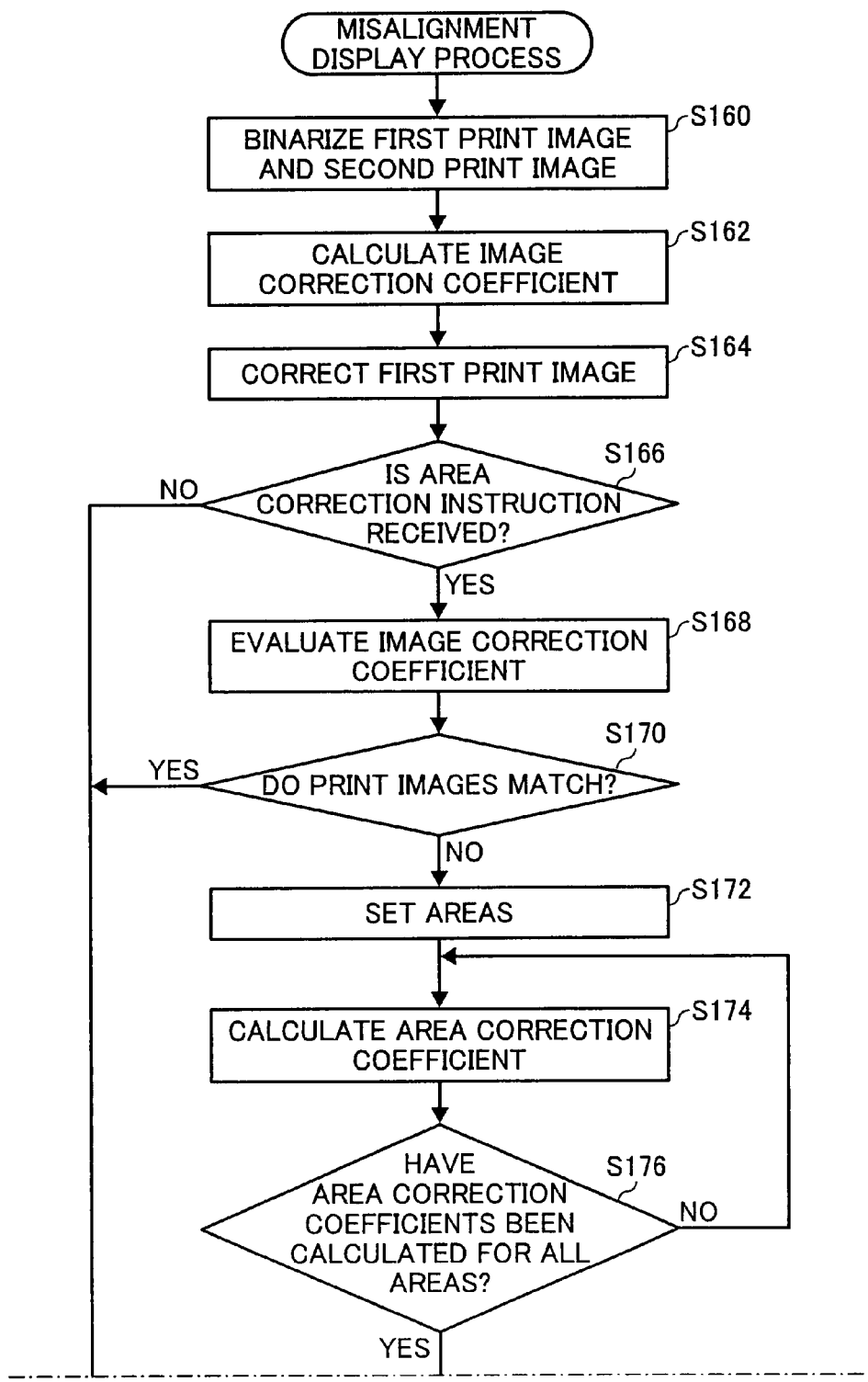

FIG. 31
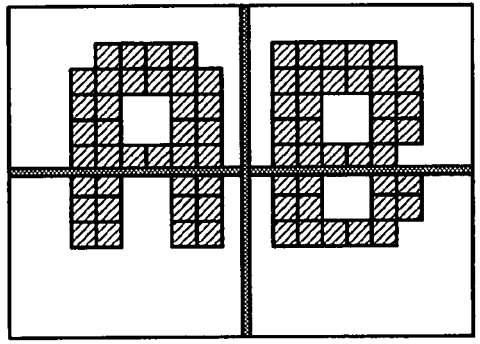
FIG. 32
FIRST PRINT IMAGE AFTER
IMAGE CORRECTION
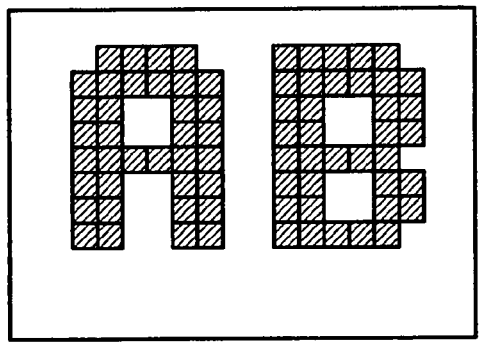
SECOND PRINT IMAGE
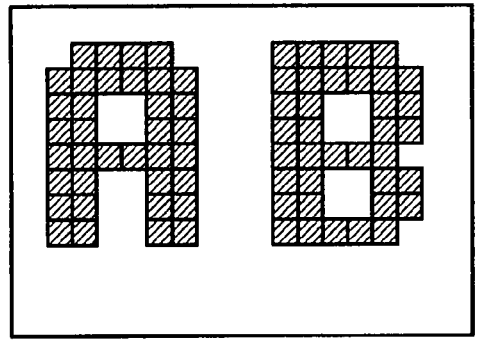
MISALIGNMENT DISPLAY IMAGE
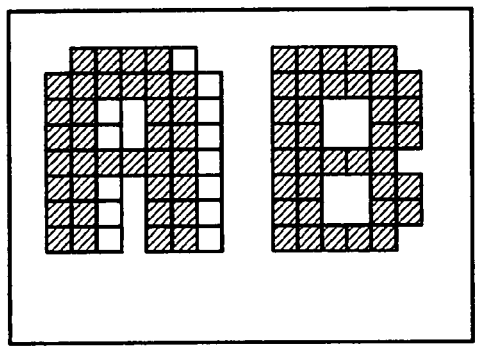

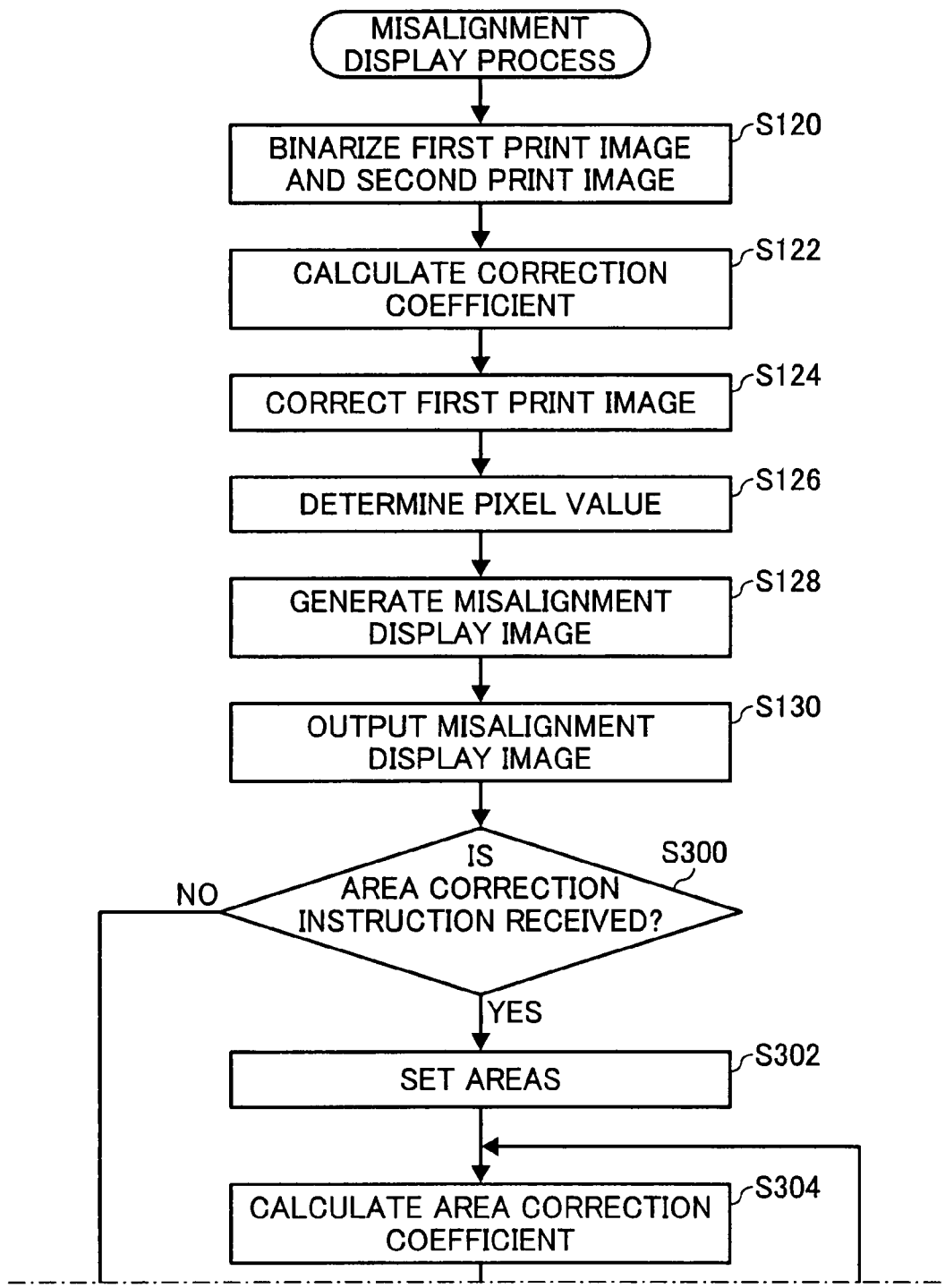

MISALIGNMENT DETECTING APPARATUS, MISALIGNMENT DETECTING METHOD, AND COMPUTER PROGRAM PRODUCT

CROSS-REFERENCE TO RELATED APPLICATIONS

The present document incorporates by reference the entire contents of Japanese priority document, 2006-099492 filed in Japan on Mar. 31, 2006 and 2007-010737 filed in Japan on Jan. 19, 2007.

BACKGROUND OF THE INVENTION

1. Field of the Invention

The present invention relates to a misalignment detecting apparatus, a misalignment detecting method, and a computer program product.

2. Description of the Related Art

Business forms such as ledgers and receipts are indispensable for business activities, and used in every facet of business including distribution and accounting. The amount of data on such forms is enormous, and technologies have been proposed to manage the data.

Recently, forms are often digitized and stored as digital data. Still, however, there are many opportunities to print the forms. Replacement of printing devices sometimes causes an error such as misalignment in printed data. Consequently, an operator has to visually check whether there is a difference before and after the replacement to check an error or the like after printing an enormous amount of form data.

In a field of medical image processing, there has been a known technology for checking a difference between two images. For example, Japanese Patent Application Laid-Open No. 2005-33656 discloses a technology in which a differential image is generated from two images.

However, in such a check by the operator, two prints are compared through visual inspection to specify a different portion. Therefore, the amount of movement of eyes is large, thereby making such comparison difficult. Also, such a check is inefficient, requiring a great deal of time and effort. Moreover, even if a differential image is generated as mentioned above, there is a problem in which it is impossible to easily ascertain which portion does not match the original image.

In one scheme, two prints are superposed each other for see-through inspection. However, the degree of transparency of paper is not high, and therefore it is difficult to check in detail. The foregoing problems also hold true not only at the time of replacement of printers but also at the time of printer development and recovery check after repair.

SUMMARY OF THE INVENTION

It is an object of the present invention to at least partially solve the problems in the conventional technology.

According to an aspect of the present invention, a misalignment detecting apparatus that detects misalignment of a second image with respect to a first image, includes a digitizing unit that digitizes images to obtain the first image and the second image, an image generating unit that generates a third image indicating misalignment between the first image and the second image in a preset mode based on misalignment between corresponding points on the first image and the second image, and an output unit that visually outputs the third image.

According to another aspect of the present invention, a misalignment detecting method for detecting misalignment of a second image with respect to a first image, includes digitizing images to obtain the first image and the second image, generating a third image indicating misalignment between the first image and the second image in a preset mode based on misalignment between corresponding points on the first image and the second image, and outputting visually the third image.

According to still another aspect of the present invention, a computer program product includes a computer usable medium having computer readable program codes embodied in the medium that, when executed, cause a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a schematic for explaining the process of correcting a first print image shown in FIG. 5;

FIG. 7 is a schematic for explaining the process of generating a misalignment display image shown in FIG. 5;

FIGS. 20A and 20B are schematics for explaining the process of calculating a difference degree according to a modification example;

FIG. 21 is an example of screen display on a display shown in FIG. 1;

FIG. 24 is a flowchart of image processing performed by the image processing system shown in FIG. 22;

FIG. 25 is a detailed flowchart of a print-position adjusting process shown in FIG. 24;

FIG. 31 is a schematic for explaining area setting;

FIG. 32 is a schematic of a first print image after image correction, a second print image, and a misalignment display image generated therefrom;

DETAILED DESCRIPTION OF THE PREFERRED EMBODIMENTS

Exemplary embodiments of the present invention are explained below in detail with reference to the accompanying drawings.

Figure 1:
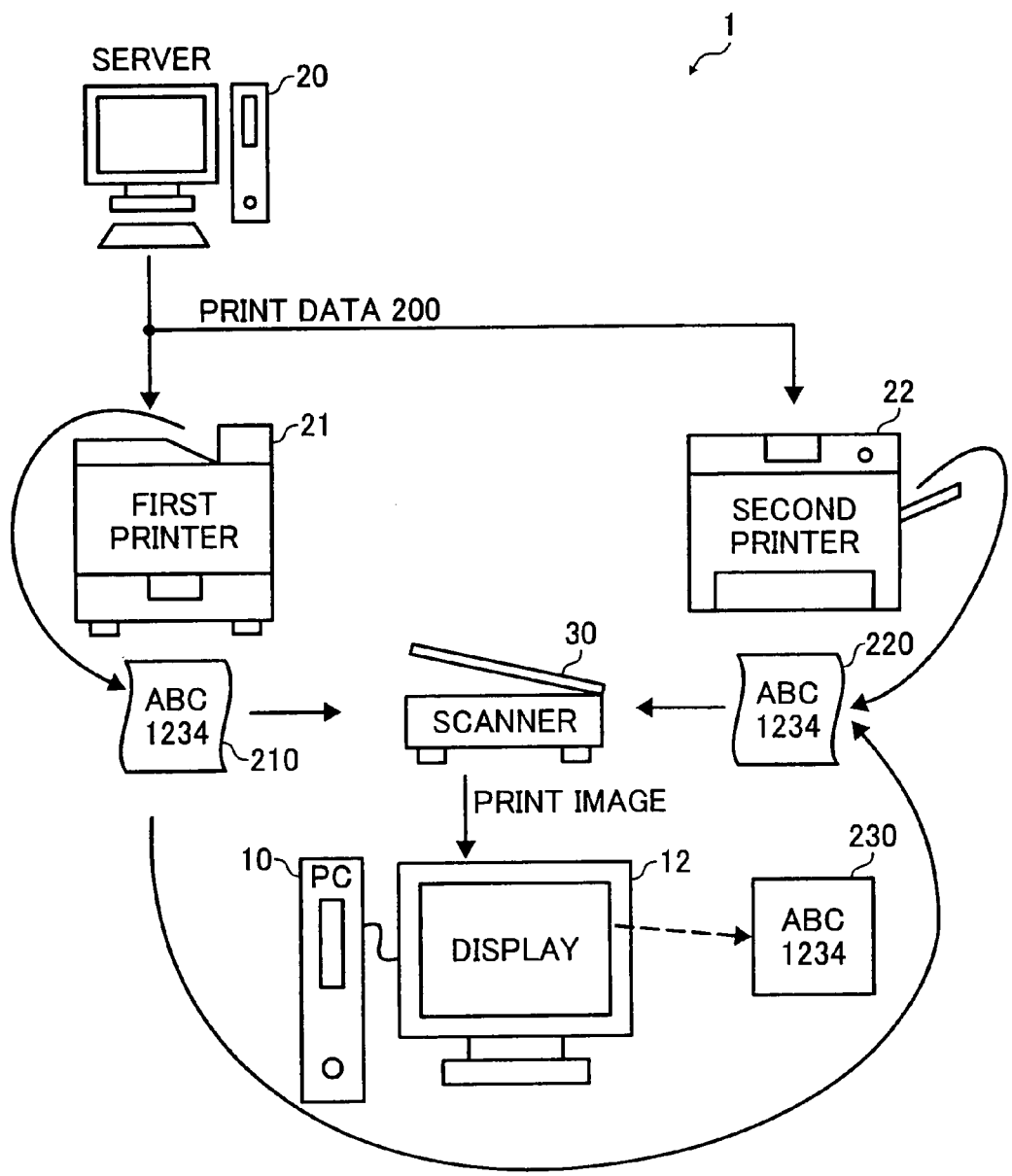
FIG. 1 is a schematic of an image processing system according to a first embodiment of the present invention.

FIG. 1 is a schematic of an image processing system 1 according to a first embodiment of the present invention. The image processing system 1 includes an image processing apparatus 10, a server 20, a first printer 21, a second printer 22, and a scanner 30.

The server 20 transmits print data 200 to the first printer 21 and the second printer 22. The first printer 21 and the second printer 22 each obtain the print data 200 for output onto a print medium such as paper. The scanner 30 reads a first print 210 output from the first printer 21 and a second print 220 output from the second printer 22. The image processing apparatus 10 generates a misalignment display image visualizing misalignment between a first print image and a second print image obtained through digitization by the scanner. Then, a misalignment display image 230 is caused to be displayed on a display 12. By visually inspecting only this misalignment display image, an operator can check a matching state between the first print 210 and the second print 220.

Figures 2, 3:
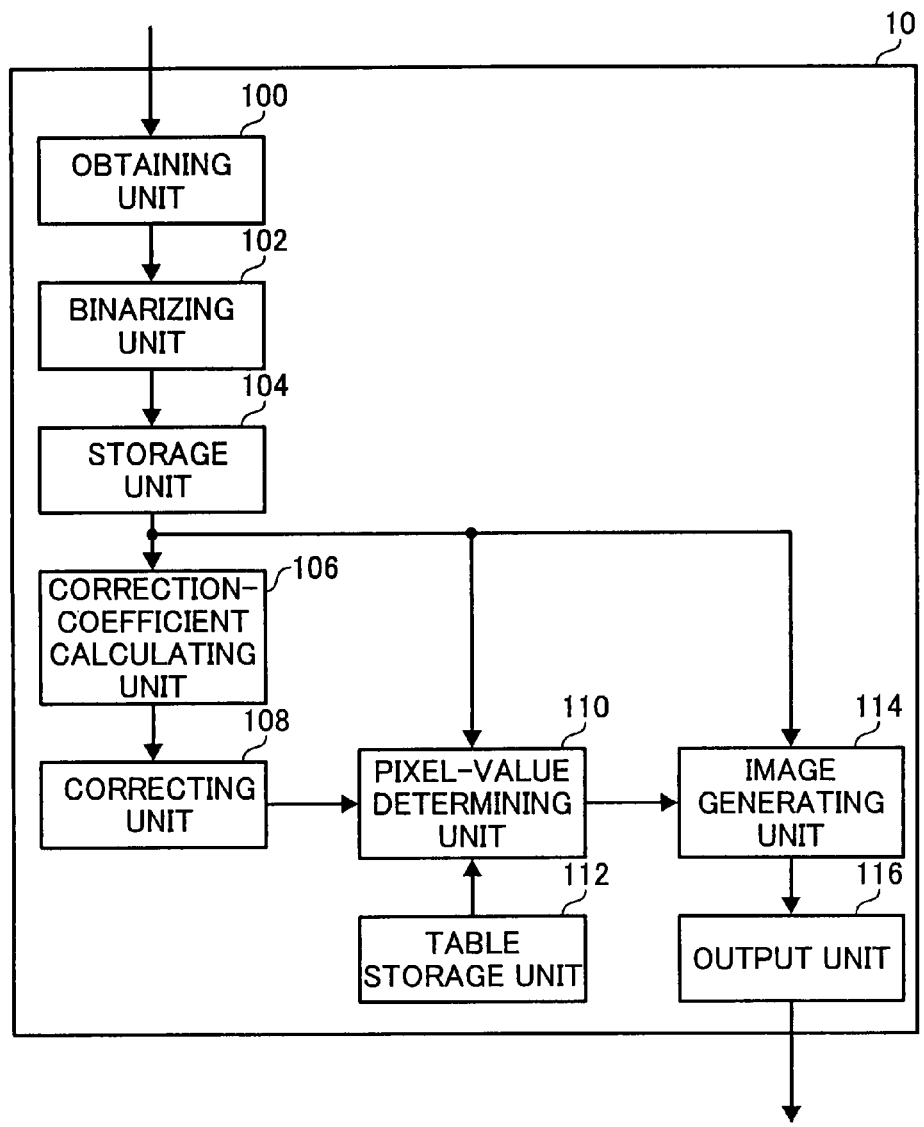
FIG. 2 is a functional block diagram of an image processing apparatus shown in FIG. 1.
FIG. 3 is an example of contents of a pixel-value determination table.

FIG. 2 is a functional block diagram of the image processing apparatus 10. The image processing apparatus 10 includes an obtaining unit 100, a binarizing unit 102, a storage unit 104, a correction-coefficient calculating unit 106, a correcting unit 108, a pixel-value determining unit 110, a table storage unit 112, an image generating unit 114, and an output unit 116.

The obtaining unit 100 obtains images read by the scanner 30. Specifically, the obtaining unit 100 obtains a first print image obtained through digitization of the first print 210 printed by the first printer 21, and a second print image obtained through digitization of the second print 220 printed by the second printer 22.

The binarizing unit 102 binarizes the print images obtained by the obtaining unit 100. Specifically, for example, with a predetermined brightness as a threshold, a pixel with brightness higher than the threshold is taken as white, whilst a pixel with brightness lower than the threshold is taken as black. The storage unit 104 stores therein the first print image and the second print image binarized by the binarizing unit 102.

The correction-coefficient calculating unit 106 calculates correction coefficients between the first print image and the second print image. When one of the first print image and the second print image has a pixel position (x, y) and the other has a corresponding pixel position (X, Y), correction coefficients ("a" to "f") are calculated by using the following Equation 1, where the correction coefficients ("a" to "f") are coefficients for use in calculating, from a pixel position of one image, its corresponding position of another image.

$$\begin{pmatrix} X \\ Y \end{pmatrix} = \begin{pmatrix} a & b \\ c & d \end{pmatrix} \begin{pmatrix} x \\ y \end{pmatrix} + \begin{pmatrix} e \\ f \end{pmatrix} \quad (1)$$

Here, with these correction coefficients, misalignment, rotation, and distortion can be corrected so that two images can be superposed each other. In more detail, for example, Japanese Patent No. 3636809, Japanese Patent No. 3600380, and Japanese Patent Application Laid-Open Publication No. 10-340348 can be referred to. For example, misalignment is represented by "|e2+f2|". Expansion or contraction is represented by "|ad−bc−1|". Distortion is represented by "|b+c|".

The scheme according to the documents mentioned above is to calculate correction coefficients after automatically extracting corresponding points of two images (points that are supposed to be located at the same position). Specifically, a sequence of black pixel components is extracted, and then a corresponding point in the extracted black pixel components is extracted. In another example, corresponding coordinates are extracted. However, there may be the case where extraction of the corresponding point may fail. In that case, the corresponding point can be entered by the operator in a form of position coordinates, thereby reliably finding correction coefficients based on this information.

The correcting unit 108 uses the correction coefficients calculated by the correction-coefficient calculating unit 106 to correct either one of the first print image and the second print image. Specifically, the position of each pixel of the target image is re-calculated with the correction coefficients. It is assumed in the embodiment that the first print image is corrected, and the first print image after correction is referred to as a corrected first image.

The pixel-value determining unit 110 compares the second print image stored in the storage unit 104 and the corrected first image obtained by the correcting unit 108 to determine a pixel value of each pixel according to a matching state. At this time, a pixel-value determination table 113 stored in the table storage unit 112 is referred to.

FIG. 3 is an example of contents of the pixel-value determination table 113. The pixel-value determination table 113 contains pixel values of the corrected first image, pixel values of the second print image, and pixel values defined by these values in a corresponding manner. As shown in FIG. 3, according to the pixel-value determination table 113, when the pixel value of the corrected first image represents black and the pixel value of the second print image represents black, a pixel value assigned to that pixel represents green. When the pixel value of the corrected first image represents black and the pixel value of the second print image represents white, a pixel value assigned to that pixel represents yellow. When the pixel value of the corrected first image represents white and the pixel value of the second print image represents black, a pixel value assigned to that pixel represents red. When the pixel value of the corrected first image represents white and the pixel value of the second print image represents white, a pixel value assigned to that pixel represents white.

Referring back to FIG. 2, the image generating unit 114 generates a misalignment display image based on the second print image stored in the storage unit 104 and the corrected first image obtained by the correcting unit 108. Each pixel of the misalignment display image is assigned the pixel value determined by the pixel-value determining unit 110.

The output unit 116 outputs the misalignment display image generated by the image generating unit 114 to the outside, specifically, to the display 12. The display 12 displays the output misalignment display image.

Figure 4:
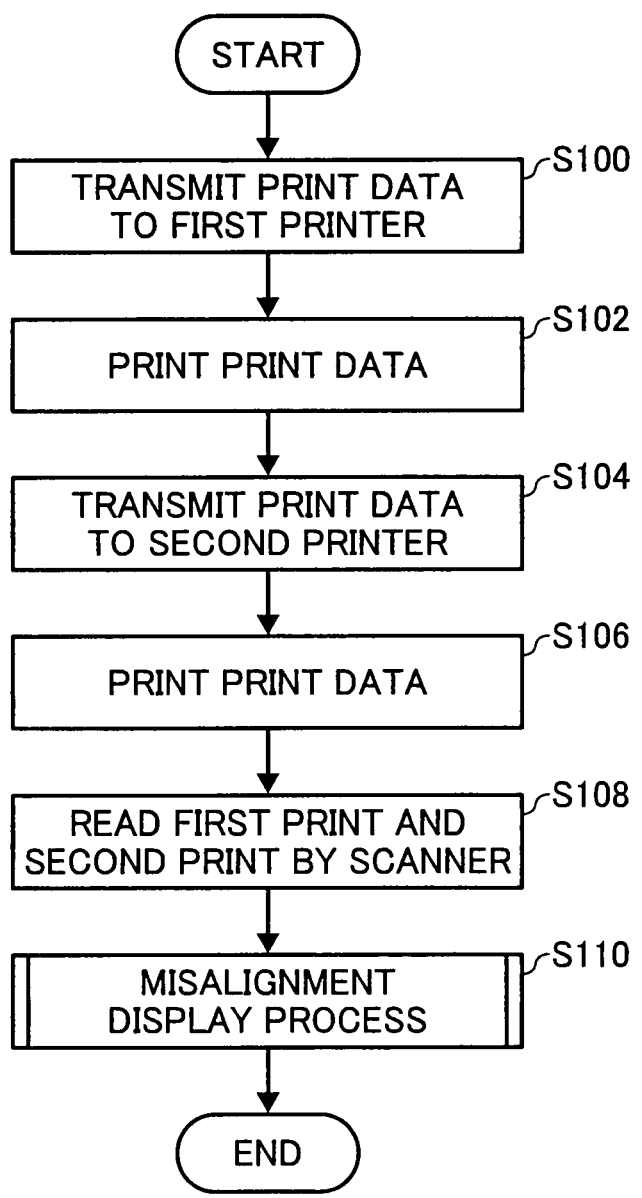
FIG. 4 is a flowchart of image processing performed by the image processing system shown in FIG. 1.

FIG. 4 is a flowchart of image processing performed by the image processing system 1. First, the server 20 transmits the print data 200 to the first printer 21 (step S100). The first printer 21 prints the received print data 200 on a print medium (step S102). The server 20 transmits the print data 200 to the second printer (step S104). The second printer 22 prints the received print data 200 on a print medium (step S106).

Next, the scanner 30 reads the print obtained by the first printer 21 and the second print obtained by the second printer 22 (step S108). That is, these prints are converted to a data form to obtain a first print image and a second print image. The image processing apparatus 10 performs a misalignment display process based on the first print image and the second print image (step S110). With this, the image processing, i.e., misalignment-display-image generating process, by the image processing system 1 is completed.

Figure 5:
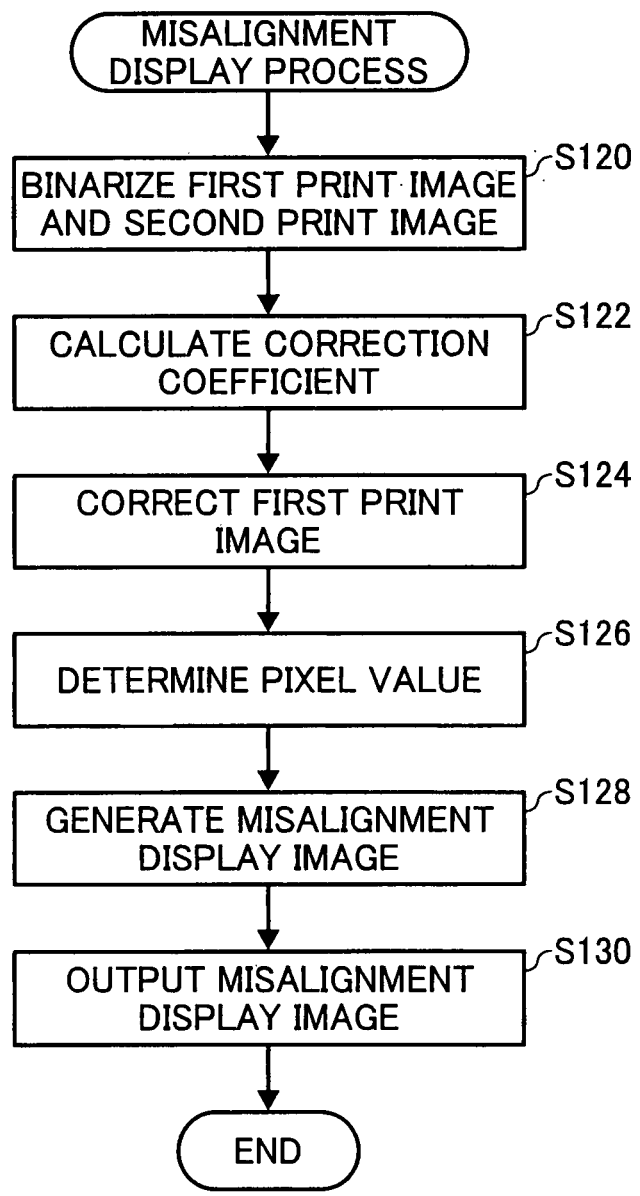
FIG. 5 is a detailed flowchart of a misalignment display process shown in FIG. 4.

FIG. 5 is a detailed flowchart of the misalignment display process shown in FIG. 4. First, when the obtaining unit 100 obtains the first print image and the second print image, the binarizing unit 102 binarizes the first and second print images (step S120). The correction-coefficient calculating unit 106 calculates a correction coefficient (step S122). The correcting unit 108 corrects the first print image to obtain a corrected first image (step S124).

Next, the pixel-value determining unit 110 determines a pixel value of each pixel according to a matching state of the corresponding pixels between the corrected first image and the second print image (step S126). The image generating unit 114 generates a misalignment display image (step S128). At this time, the pixel values determined by the pixel-value determining unit 110 are assigned to the relevant pixels. The output unit 116 outputs the misalignment display image to the display 12 (step S130).

FIG. 6 is a schematic for explaining the process of correcting the first print image (at step S124 in FIG. 5). For example, when the image is misaligned in a horizontal direction, the image is shifted in a horizontal direction through recalculation based on the correction coefficients as shown in FIG. 6.

For example, in form data, a subtle mismatch between images, such as a slight misalignment of a ruled line, does not pose a problem. For this reason, prior to generating a misalignment display image, the first print image is corrected. This allows generation of a misalignment display image from which only a problematic mismatch between images can be ascertained.

FIG. 7 is a schematic for explaining the process of generating the misalignment display image (at step S128 in FIG. 5).

Based on the pixel-value determination table 113, to an area 241 in which pixels of the corrected first image and those of the second print image are both black, a pixel value representing green is assigned. To an area 242 in which pixels of the corrected first image are black and those of the second print image are white, a pixel value representing yellow is assigned. To areas 243a and 243b in which pixels of the corrected first image are white and those of the second print image are black, a pixel value representing red is assigned.

In this manner, by assigning different colors according to the pixel matching state, a checker can easily ascertain the pixel matching state through visual inspection. Therefore, troubles taken when specifying a misaligned area through visual inspection can be significantly reduced.

Colors can be set in the pixel-value determination table 113 so that a conspicuous color is assigned to an area indicating a difference to be mainly checked. This facilitates a visual inspection check. In the embodiment, an area with the pixel value of the corrected first image representing white and the pixel value of the second print image representing black is made conspicuous more than an area with the pixel value of the corrected first image representing black and the pixel value of the second print image representing white. Specifically, red is assigned to the area with the pixel value of the corrected first image representing white and the pixel value of the second print image representing black. On the other hand, yellow is assigned to the area with the pixel value of the corrected first image representing black and the pixel value of the second print image representing white. Since yellow is difficult to differentiate from white in appearances, red is relatively conspicuous than yellow. In this manner, by assigning a color with a large difference in hue, brightness, and others, visual inspection can be facilitated.

Figure 8:
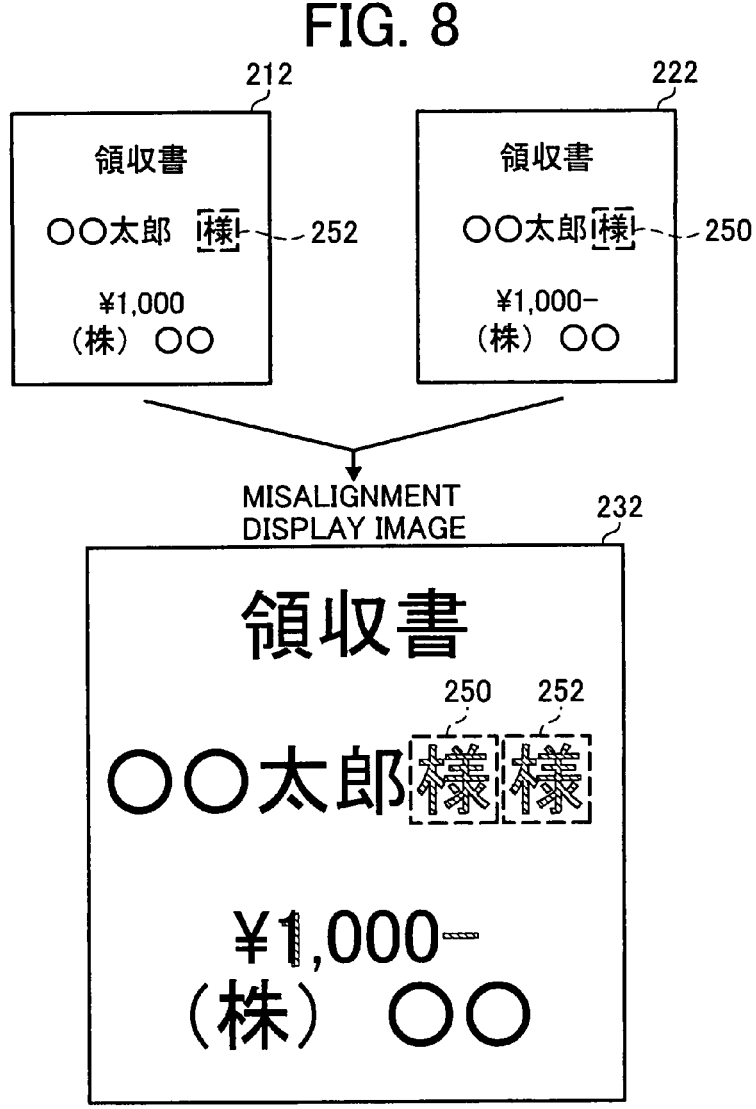
FIG. 8 is an example of a misalignment display image.

FIG. 8 is an example of a misalignment display image. From a corrected first image 212 and a second print image 222 shown in FIG. 8, a misalignment display image 232 is generated. Between the corrected first image 212 and the second print image 222, characters 250 and 252 are misaligned. Therefore, in the misalignment display image 232, yellow is assigned to the character 252 corresponding to that of the corrected first image 212, whilst red is assigned to the character 250 corresponding to that of the second print image 222.

Also, "−" next to "1000" is present only in the second print image 222. Therefore, "−" in the misalignment display image is assigned red. Further, on the right side of "1", there is a portion where "1" in the corrected first image 212 and "1" in the second print image 222 does not exactly overlap each other, and this portion is assigned red. Other portions than those explained above do match, and are assigned green.

In this manner, colors according to the pixel matching state of each pixel in the corrected first image and the second print image are assigned to the misalignment display image. Therefore, the pixel matching state can be easily ascertained through visual inspection.

Figure 9:
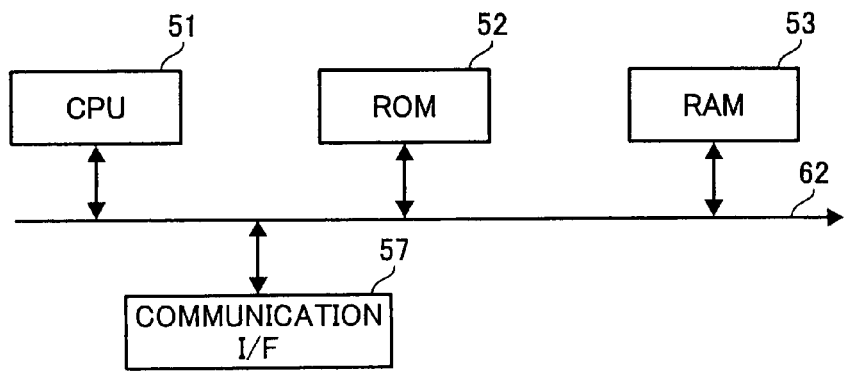
FIG. 9 is a schematic of a hardware configuration of the image processing apparatus.

FIG. 9 is a schematic of a hardware configuration of the image processing apparatus 10. The image processing apparatus 10 includes, as hardware, a Read-Only Memory (ROM) 52 that stores therein computer programs such as an image processing program for image processing performed by the image processing apparatus 10, a Central Processing Unit (CPU) 51 that control each unit of the image processing apparatus 10 according to the computer programs in the ROM 52, a Random Access Memory (RAM) 53 that stores therein various data required for controlling the image processing apparatus 10, a communication interface (I/F) 57 connected to a network for communication, and a bus 62 connecting the respective units.

The image processing program can be provided as being recorded on a computer-readable recording medium, such as a Compact Disk Read-Only Memory (CD-ROM), a floppy (registered trademark) disk (FD), a Digital Versatile Disk (DVD), as a file in an installable or executable format.

In this case, the image processing program is loaded from the recording into a main storage device of the image processing apparatus 10 for execution. Thus, each unit explained above is implemented on the main storage device.

The image processing program can also be stored in a computer connected to a network, such as the Internet, and downloaded via the network.

While, in the first embodiment, the first printer 21 and the second printer 22 output the same print data 200 to the print medium, these printers can output different pieces of print data. In this case, these pieces of print data have to be those from which the same print result is expected.

In the first embodiment, the image processing apparatus 10 includes the binarizing unit 102. However, the binarizing unit 102 is not necessary when image data obtained by the obtaining unit 100 are binary data.

Instead of outputting a misalignment display image to the display 12, the output unit 116 outputs it to, for example, the first printer 21 to obtain a corresponding print. In this case, by visually checking the print, an operator can determine the image matching state.

In the first embodiment, the image processing system generates a misalignment display image indicating misalignment between the prints of the first printer 21 and the second printer 22. The misalignment display image can be generated to indicate misalignment between images printed on print media delivered from different paper-feeding trays on the same printer. With this, an operator can visually check misalignment of images with respect to each paper-feeding tray.

In the first embodiment, the image processing system generates a misalignment display image in which different pixel values are assigned according to the pixel matching state. The misalignment display image is not so limited and can be generated in a different manner as long as an image of a different format is generated according to the pixel matching state. For example, a misalignment display image can indicate misalignment by circling it, hatching it, or presenting a message indicative of the presence of misalignment.

Figure 10:
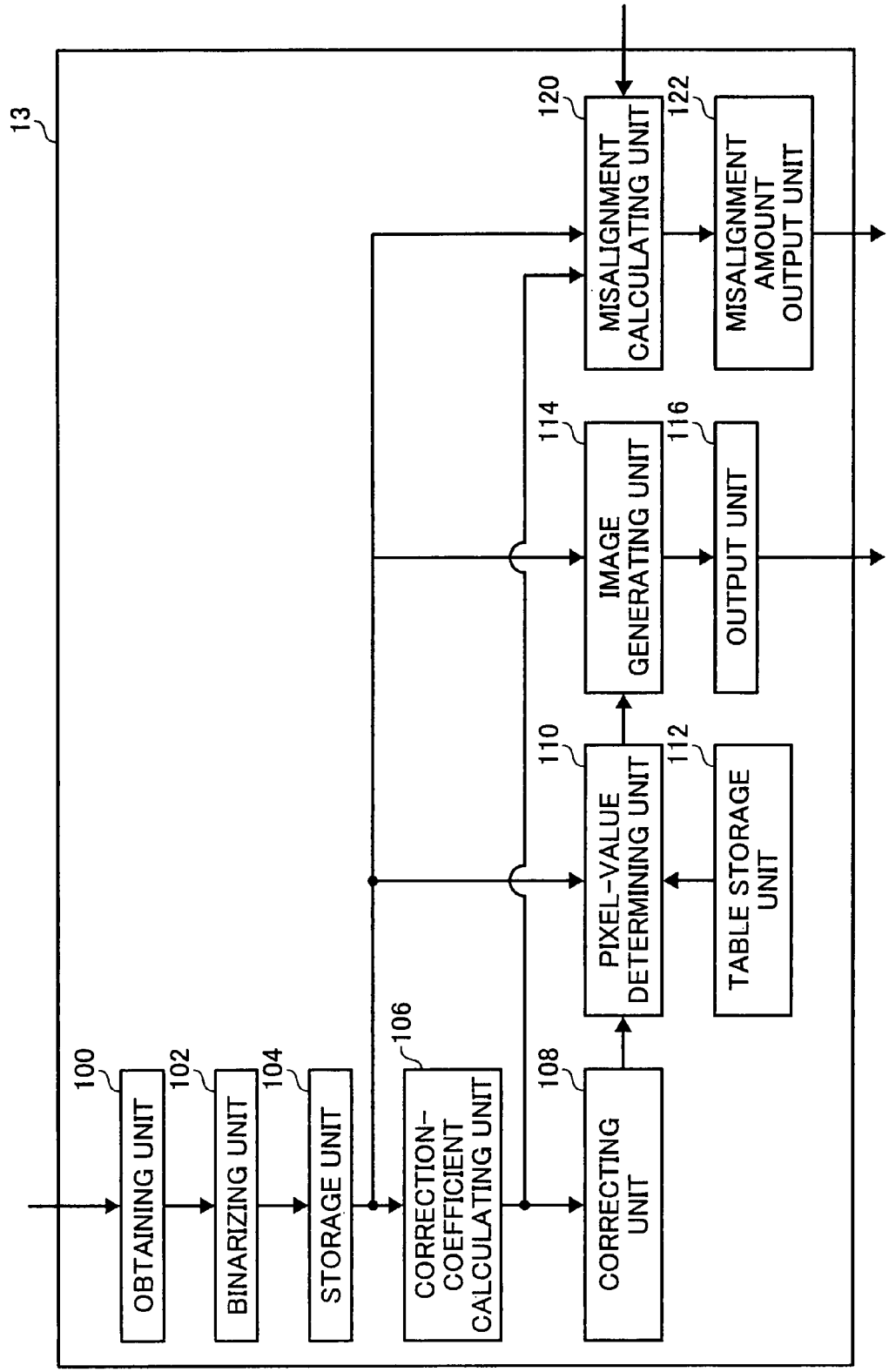
FIG. 10 is a functional block diagram of an image processing apparatus according to a second embodiment of the present invention.

FIG. 10 is a functional block diagram an image processing apparatus 13 according to a second embodiment of the present invention. The image processing apparatus 13 is in many respects similar to the image processing apparatus 10 except for the presence of a misalignment calculating unit 120 and a misalignment amount output unit 122. The misalignment calculating unit 120 calculates, based on the correction coefficients, a misalignment amount in the misalignment display image generated by the image generating unit 114. Specifically, coefficients (e, f) in Equation 1 are calculated. The misalignment amount output unit 122 outputs the misalignment amount calculated by the misalignment calculating unit 120.

Figures 11, 12:
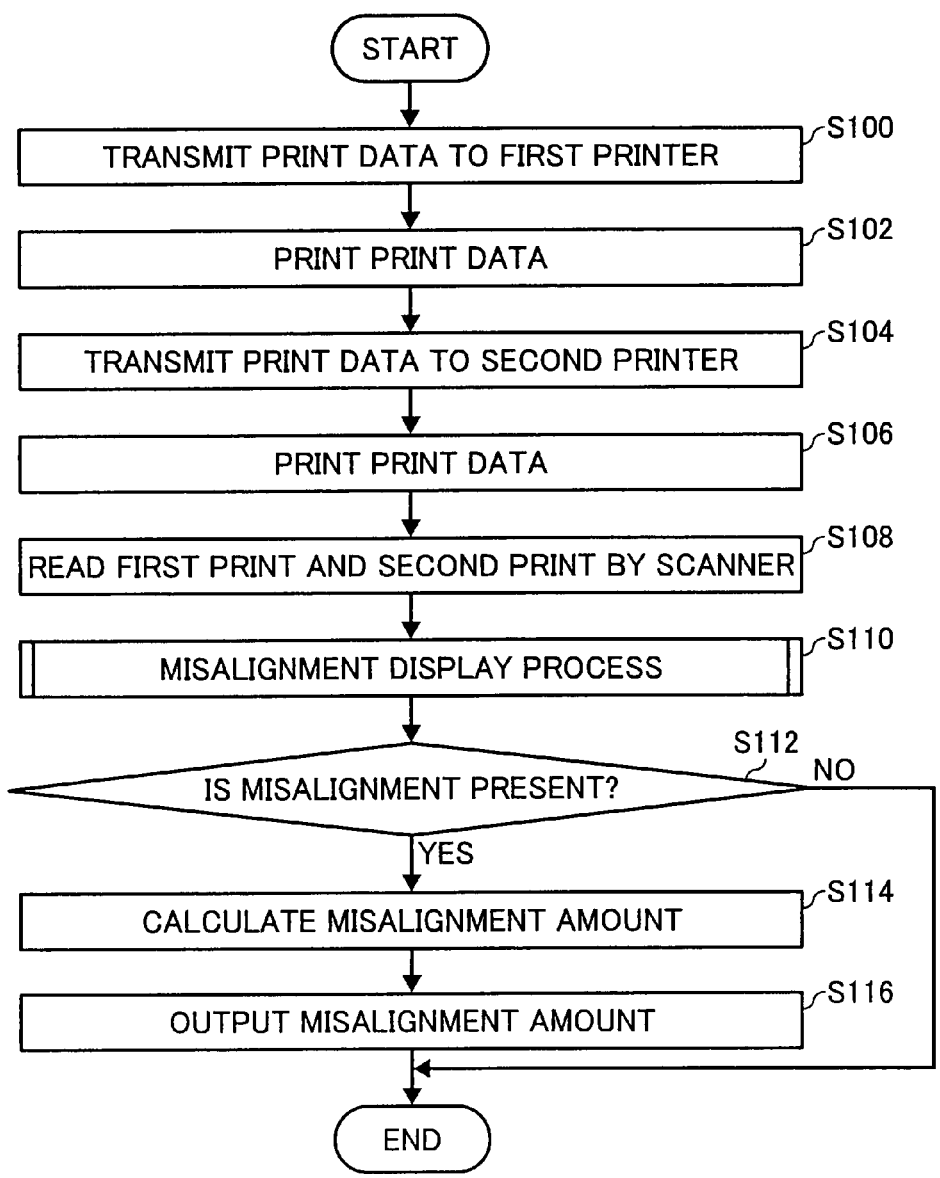
FIG. 11 is an example of screen display of correction values output from a misalignment amount output unit shown in FIG. 10.
FIG. 12 is a flowchart of image processing according to the second embodiment.

FIG. 11 is an example of screen display of misalignment amount output from the misalignment amount output unit 122 on the display 12. In this manner, an image identification (ID) identifying a misalignment display image corresponding to the first print image and the second print image for which the misalignment amount has been calculated and the calculated misalignment amount are displayed. Based on these values, the operator sets to the first printer 21 a misalignment adjusting amount for correcting the misalignment. With this, misalignment between the first print image and the second print image can be corrected.

FIG. 12 is a flowchart of image processing according to the second embodiment. In the image processing, i.e., misalignment-display-image generating process, according to the second embodiment, after the misalignment display process (step S110), when the operator determines that misalignment is present and specifies as such (Yes at step S112), the misalignment calculating unit 120 receives this specification and calculates a misalignment amount (step S114). Next, the misalignment amount output unit 122 outputs the misalignment amount calculated by the misalignment calculating unit 120 (step S116). The image process by the image processing system 1 according to the second embodiment is thus completed.

The configuration and processes other than those explained above in the image processing system according to the second embodiment are similar to the configuration and processes in the image processing system 1 according to the first embodiment.

While, in the second embodiment, the image processing apparatus 13 calculates and outputs the misalignment amount, a misalignment adjusting amount for correcting the misalignment can be calculated and output. In this case, the operator can set the misalignment adjusting amount in the first printer 21. The misalignment adjusting amount is calculated from the misalignment amount, and is a value defined according to the model and individual capability of the first printer 21.

Figure 13:
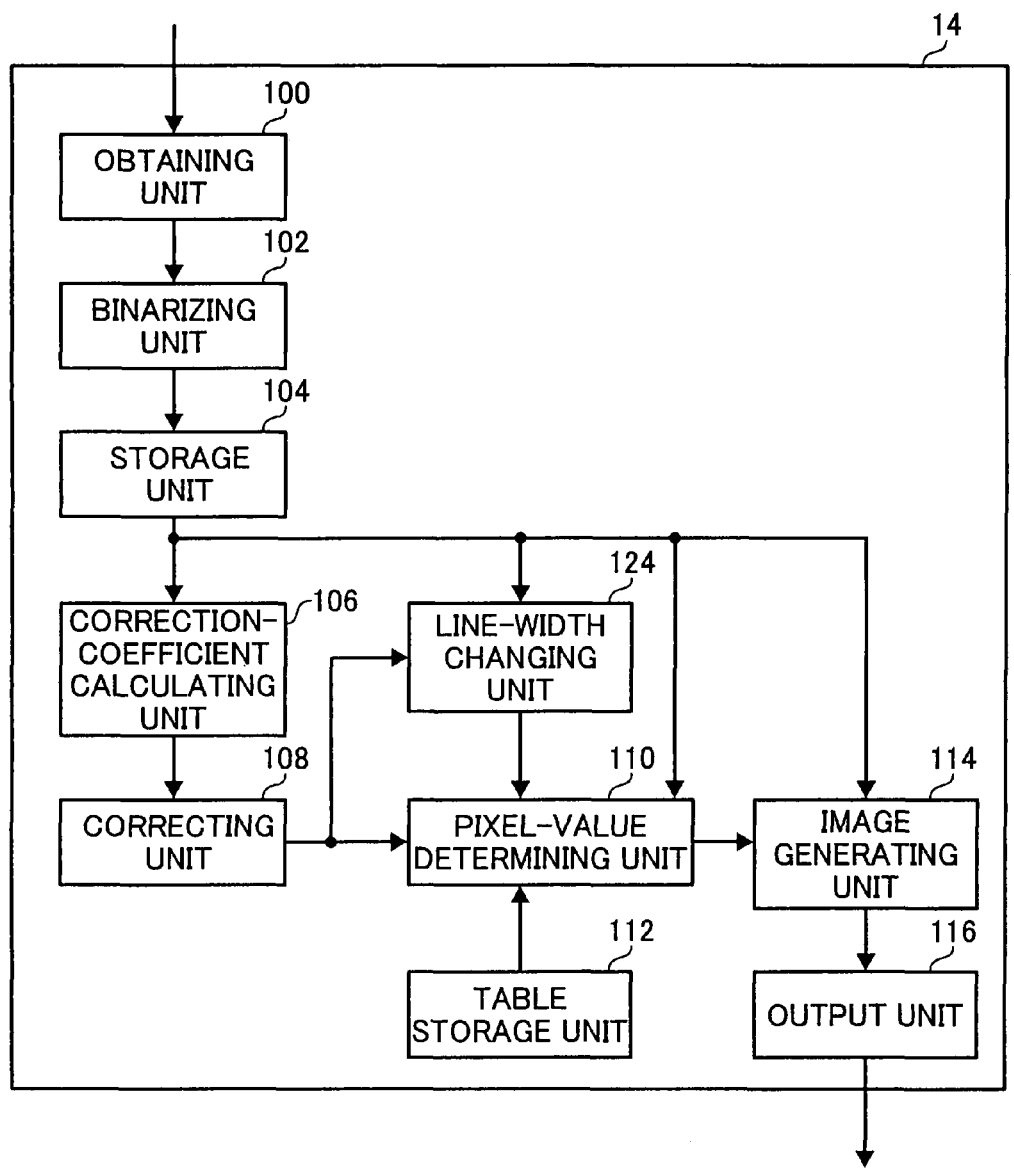
FIG. 13 is a functional block diagram of an image processing apparatus according to a third embodiment of the present invention.

FIG. 13 is a functional block diagram of an image processing apparatus 14 according to a third embodiment of the present invention. The image processing apparatus 14 is in many respects similar to the image processing apparatus 10 except for the presence of a line-width changing unit 124. The line-width changing unit 124 thickens a line in either one of the corrected first image and the second print image. Here, the image in which a line is to be thickened may be any one of the corrected first image and the second print image. Here, which image is to be processed is set in advance. The pixel-value determining unit 110 determines a pixel value by using the image after thickening the line by the line-width changing unit 124.

Figure 14:
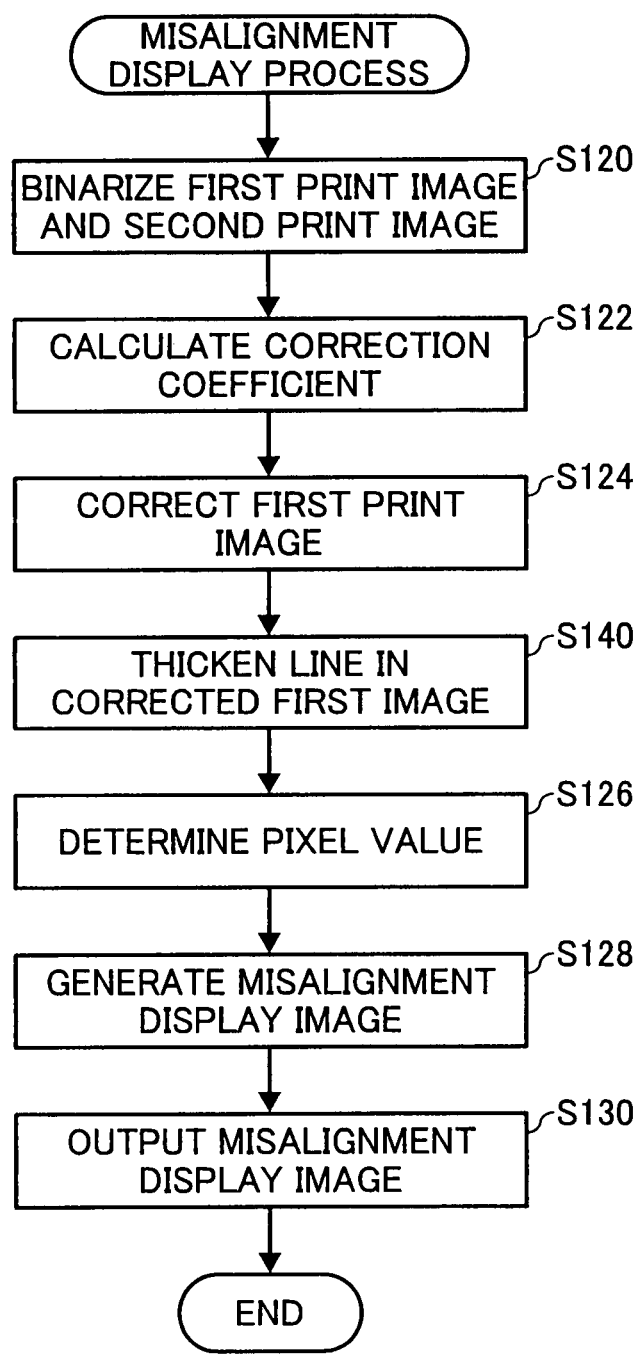
FIG. 14 is a detailed flowchart of a misalignment display process according to the third embodiment.

FIG. 14 is a detailed flowchart of a misalignment display process performed by the image processing apparatus 14. After correcting the first print image (step S124), the line-width changing unit 124 thickens a line in either one of the corrected first image and the second print image (step S140).

Next, the pixel-value determining unit 110 determines a pixel value based on the matching state between one image with its line thickened by the line-width changing unit 124 and the other image (step S126). Specifically, when the line in the corrected first image is thickened, the corrected first image after the thickening process and the second print image are used. On the other hand, when the line in the second print image is thickened, the corrected first image and the second print image after processing are used.

Figure 15:
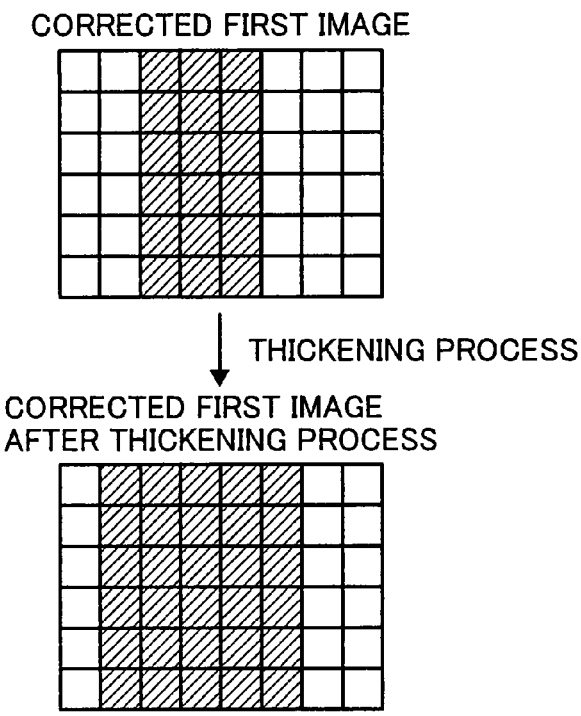
FIG. 15 is a schematic for explaining the process of thickening a line in a corrected first image shown in FIG. 14.

FIG. 15 is a schematic for explaining the process of thickening a line in the corrected first image (at step S140 in FIG. 14). In an example shown in FIG. 15, the line is thickened on both sides, right and left, by one pixel. In this manner, the line is thickened to a predetermined width. Here, the degree of thickening is arbitrary.

Figure 16:
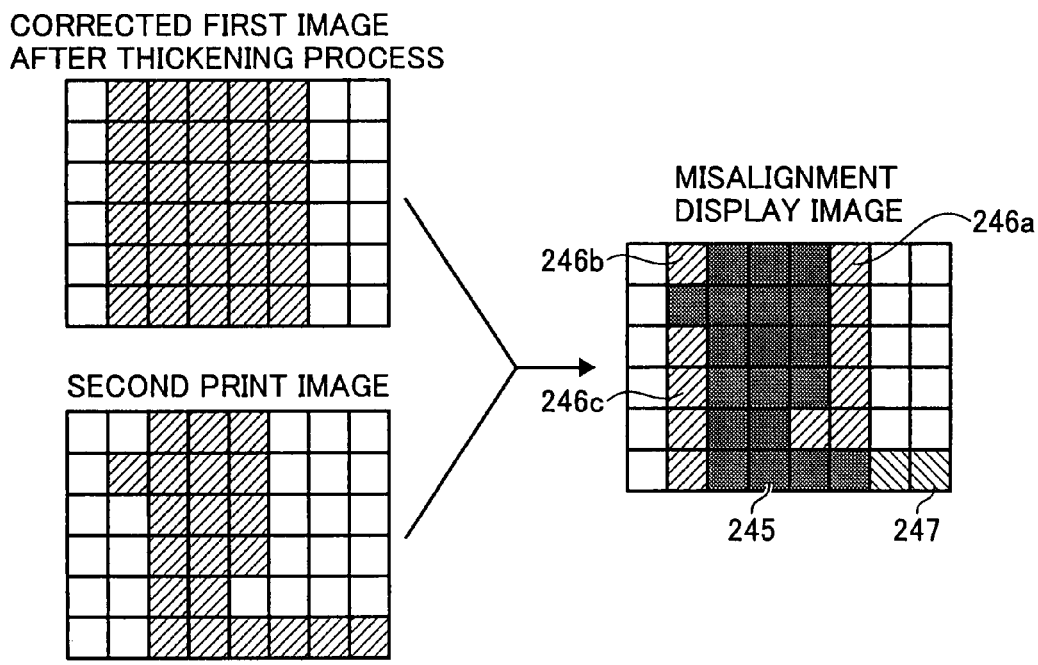
FIG. 16 is a schematic for explaining the process of generating a misalignment display image shown in FIG. 14.

FIG. 16 is a schematic for explaining the process of generating a misalignment display image (at step S128 in FIG. 14) according to the third embodiment. Based on the pixel-value determination table 113, green is assigned to an area 245 in which both pixels of the corrected first image after the thickening process and the second print image are black. Yellow is assigned to areas 246a, 246b, and 246c in which pixel values of the corrected first image after the thickening process represent black and those of the second print image represent white. Red is assigned to an area 247 in which pixel values of the corrected first image after the thickening process represent white and those of the second print image represent black.

In the embodiment, an inconspicuous color is assigned to the areas, such as the areas 246a, 246b, and 246c in FIG. 16, in which the image subjected to the thickening process is black, thereby making a portion with an unproblematic misalignment inconspicuous. With this, only the portion where misalignment to be detected through visual inspection occurs can be made conspicuous.

Figure 17:
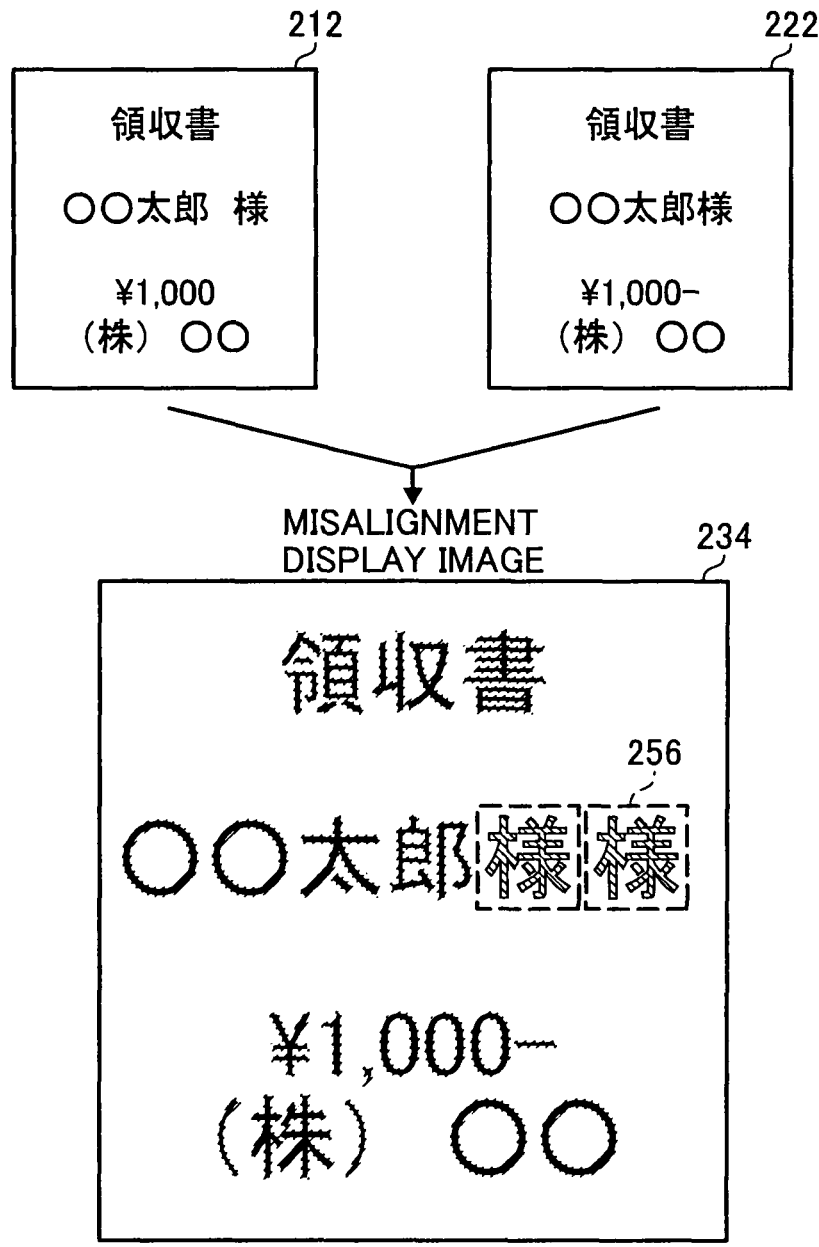
FIG. 17 is an example of a misalignment display image.

FIG. 17 is an example of a misalignment display image. From a corrected first image after the thickening process and the second print image 222 shown in FIG. 17, a misalignment display image 234 is generated. Because the corrected first image has been subjected to the thickening process, there are many pixels that are black only in the corrected first image 212. In the misalignment display image 234, there are many yellow areas surrounding each green character. However, yellow is inconspicuous, and these areas are difficult to differentiate in visual inspection. Such a subtle displacement does not pose a problem, and that is why such an inconspicuous color is assigned.

In the example explained with reference to FIG. 8 in the first embodiment, the red area is present on the right side of "1". However, such a displacement does not pose a problem, and therefore, this area is preferably made inconspicuous. In the third embodiment, with the thickening process, the area on the right side of "1" is also a yellow area. In this manner, by performing a process of thickening lines in advance, the amount of red areas can be reduced. Therefore, the conspicuous color can be assigned only to the areas to be noted.

In the example shown in FIG. 17, red is assigned only to a character area 256 and an area of "-" next to "1000". These areas are those to be noted. In this manner, in the third embodiment, the conspicuous color can be assigned only to the areas to be noted.

The configuration and processes other than those explained above in an image processing system according to the third embodiment are similar to the configuration and processes in the image processing system according to any of the other embodiments.

Incidentally, when a line in the corrected first image is to be thickened, a line in the first print image before correction can be thickened.

Figure 18:
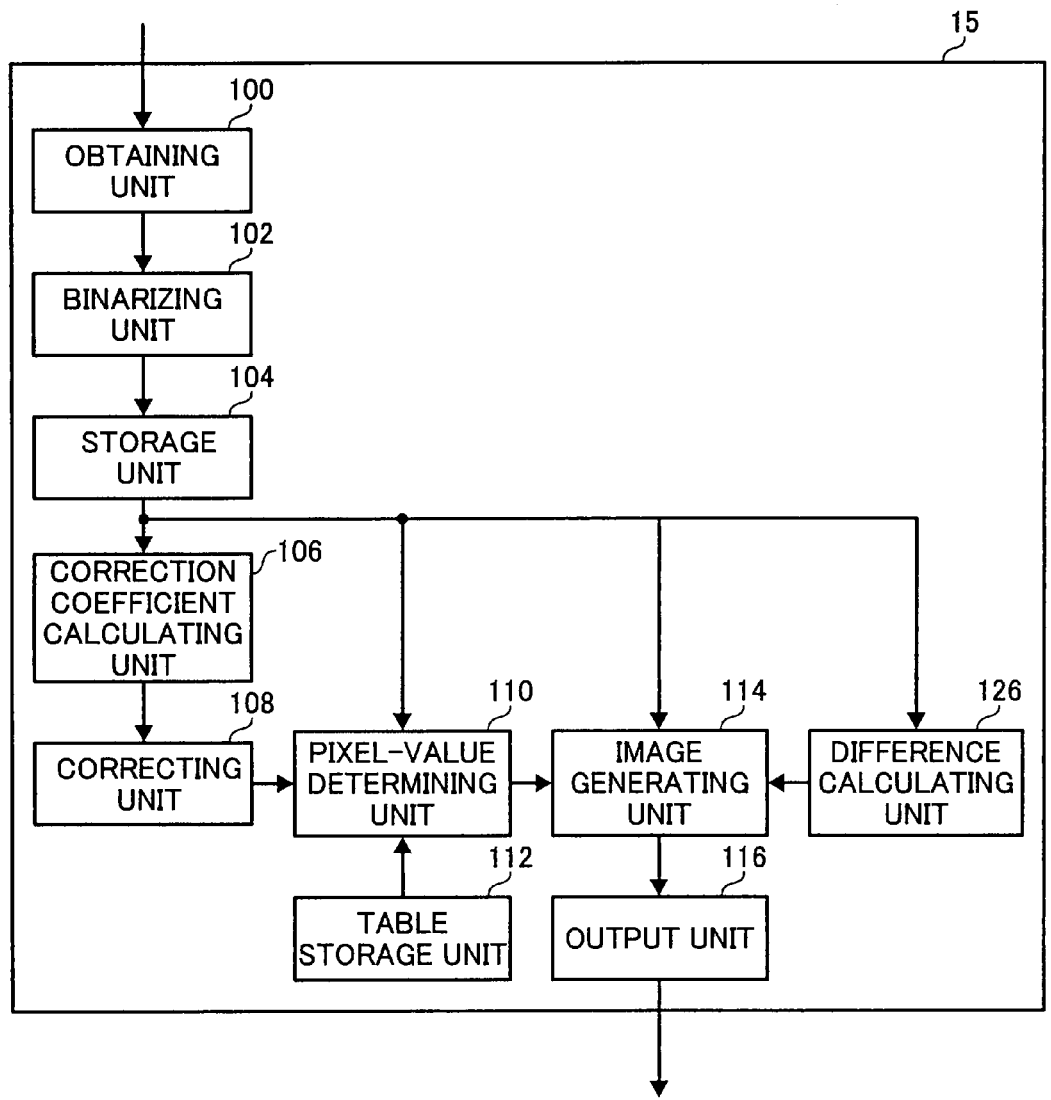
FIG. 18 is a functional block diagram of an image processing apparatus according to a fourth embodiment of the present invention.

FIG. 18 is a functional block diagram of an image processing apparatus 15 according to a fourth embodiment of the present invention. The image processing apparatus 15 is in many respects similar to the image processing apparatus 10 except for the presence of a difference calculating unit 126. The difference calculating unit 126 calculates a degree of difference between the first print image and the second print image. Specifically, the number of pixels not matching the corresponding pixel values is counted and, if the number of pixels is equal to or larger than a threshold, no match is determined. The output unit 116 determines that these images do not match when the degree of difference calculated by the difference calculating unit 126 is equal to or larger than a threshold, and then outputs a misalignment display image generated from these images.

Figure 19:
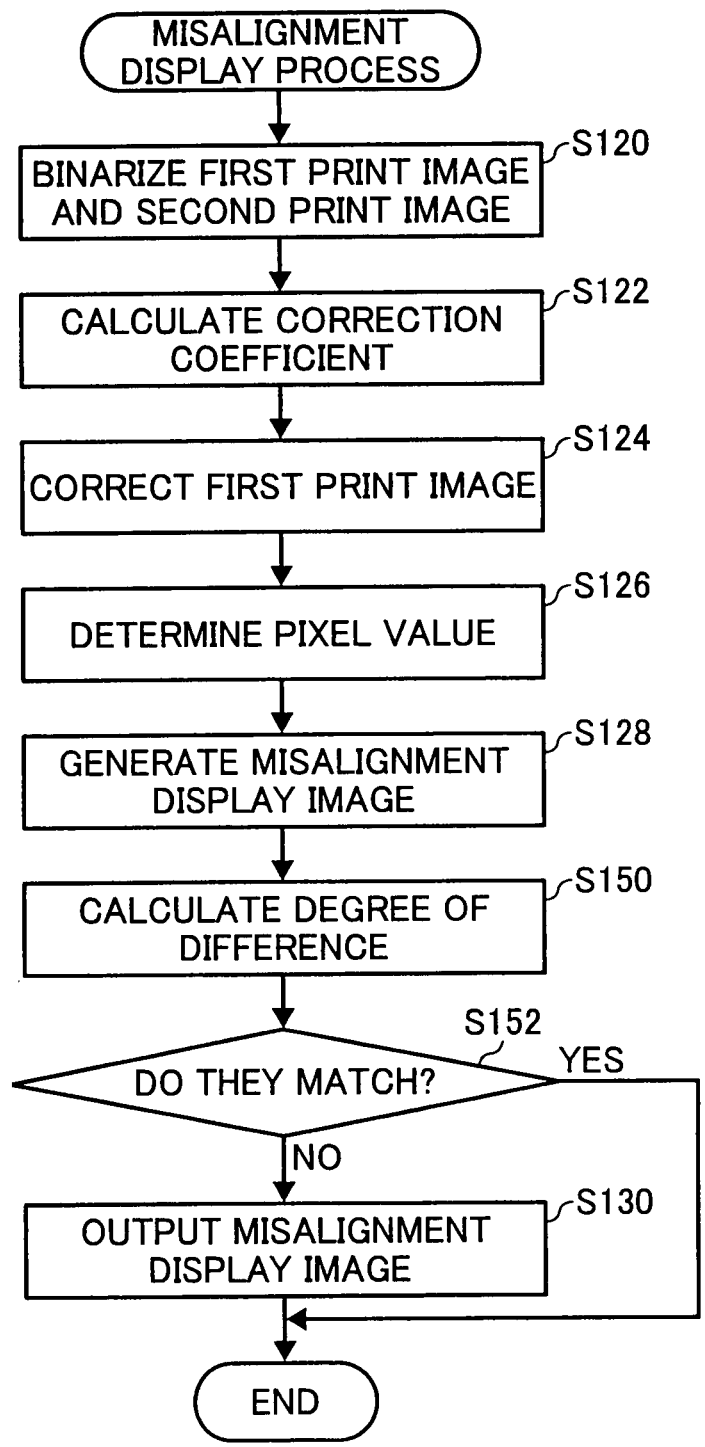
FIG. 19 is a detailed flowchart of a misalignment display process according to the fourth embodiment.

FIG. 19 is a detailed flowchart of a misalignment display process performed by the image processing apparatus 15. After a misalignment display image is generated (step S128), the difference calculating unit 126 calculates a degree of difference between the first print image and the second print image (step S150). If they do not match (No at step S152), the output unit 116 outputs the misalignment display image generated by the image generating unit 114 (step S130). On the other hand, it is determined that they match (Yes at step S152), it is determined that no misalignment to be noted is present in these images, and the misalignment display image generated from these images is not output. The image processing, i.e., misalignment-display-image generating process, is thus completed (step S110).

In this manner, according to an image processing system of the fourth embodiment, the misalignment display image is output to prompt the operator for visual inspection only when it is determined that the first print image and the second print image do not match. With this, the process load on the operator can be reduced. For example, in the case where inspection has to be made on an enormous amount of prints, if visual inspection has to be performed on every misalignment display image, much efforts have to be expended. By contrast, in the image processing system according to the fourth embodiment, a misalignment display image in which matching can be determined by the image processing apparatus 15 even without performing visual inspection is not output. Therefore, efforts of visual inspection can be reduced.

The configuration and processes other than those explained above in the image processing system according to the fourth embodiment are similar to the configuration and processes in the image processing system according to any of the other embodiments.

A modification example of the fourth embodiment is explained. In the modification example, the degree of difference is calculated based on a misalignment display image generated from the first print image and the second print image and the shape of each image contained in the first print image or the second print image.

FIGS. 20A and 20B are schematics for explaining the process of calculating a difference degree according to the modification example. The state shown on the left side of FIG. 20A is such that an image in the first print image and an image in the second print image do not match but are superposed each other. In this case, when a portion matching the original image (the first print image or the second print image) is extracted, the remaining portion has a shape as shown on the right side of the drawing.

On the other hand, the state shown on the left side of FIG. 20B is such that an image in the first print image and an image in the second print image are not superposed each other at all. In this case, when a portion matching the original image is extracted, the remaining portion has a shape as shown on the right side of the drawing. That is, the shape identical to that of the original image is left.

As explained above, as the degree of matching is lower, a shape more similar to that of the original image appears in the remaining portion. Therefore, the difference calculating unit 126 according to the modification example can calculate a degree of difference between this remaining portion and the original image. With this value, the degree of matching between the first print image and the second print image can be determined.

In the image processing system according to the fourth embodiment, a misalignment display image is output when the degree of difference is equal to or larger than the threshold and no match is determined. However, the degree of difference and the misalignment display image ID that identifies the misalignment display image can be output in an associated manner. FIG. 21 is an example of screen display on the display 12. On the display 12, the misalignment display image ID and the degree of difference are displayed.

Display can be made with sorting in the order in which the degree of difference is lower or higher. Further, by specifying an image ID, a corresponding misalignment display image may be displayed. With these, the operator can visually inspect only the misalignment display image determined as requiring visual inspection.

A misalignment display image with a degree of difference equal to or larger than the predetermined threshold can be identified and displayed so that it can be ascertained that the degree of difference is equal to or larger than the threshold. Information indicating that the degree of difference is equal to or larger than the threshold may also be displayed. Also, an image ID corresponding to an image with a degree of difference equal to or larger than the threshold can be displayed with a typeface and a color that are different from those of the other image IDs.

In the image processing system according to the fourth embodiment, the misalignment display image is output when the compared images do not match based on the calculated degree of difference. At this time, an image indicative of a warning can be further displayed, or a warning sound can be produced from a loudspeaker.

The image processing apparatus need not include the pixel-value determining unit 110 and the table storage unit 112. In this case, the image generating unit 114 generates a binary misalignment display image.

Figure 22:
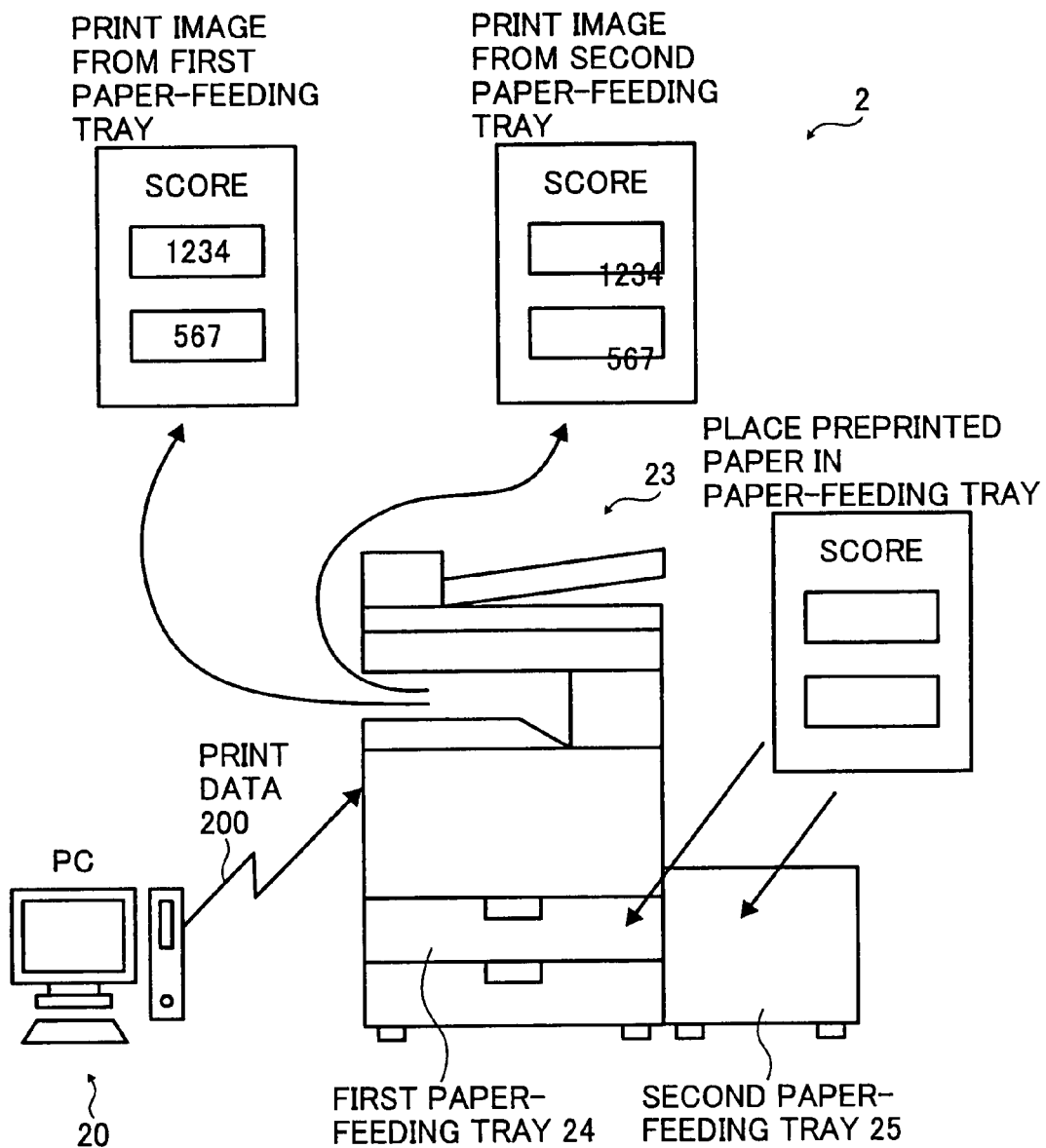
FIG. 22 is a schematic of an image processing system according to a fifth embodiment of the present invention.

FIG. 22 is a schematic of an image processing system 2 according to a fifth embodiment of the present invention. The image processing system 2 includes the server 20 and a Multifunction Product (MFP) 23. The MFP 23 has a printer function and a scanner function. In the fifth embodiment, the operator first adjusts position of a print image output from a first paper-feeding tray 24, and then the image processing system 2 adjusts misalignment between print images output from the first paper-feeding tray 24 and a second paper-feeding tray 25. A print position may be varied depending on the paper-feeding tray, and such misalignment can be adjusted.

For example, there is the case where a numerical character is to be printed within a print target frame of preprinted paper, such as a standard form. In printing onto preprinted paper, even if the position is adjusted with settings of the printer so that a print position is aligned for a particular paper-feeding tray, another alignment is required for another paper-feeding tray.

The first paper-feeding tray 24 and the second paper-feeding tray 25 have stored thereon preprinted paper media. The print data 200 is printed on each of the print media in the first paper-feeding tray 24 and the second paper-feeding tray 25. Then, a first print with the print data 200 printed onto a first print medium delivered from the first paper-feeding tray 24 and a second print with the print data 200 printed onto a second print medium delivered from the second paper-feeding tray 25 are read by a scanner. Then, based on misalignment between these prints, the misalignment is corrected.

Figure 23:
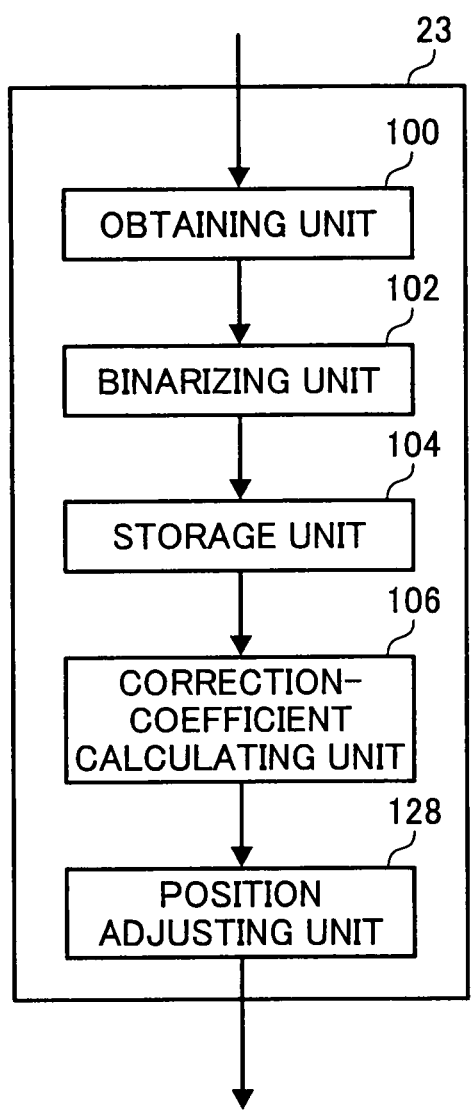
FIG. 23 is a functional block diagram of a Multifunction Product (MFP) shown in FIG. 22.

FIG. 23 is a functional block diagram of the MFP 23. The MFP 23 includes the obtaining unit 100, the binarizing unit 102, the storage unit 104, the correction-coefficient calculating unit 106, and a position adjusting unit 128. The obtaining unit 100, the binarizing unit 102, the storage unit 104, and the correction-coefficient calculating unit 106 have functions similar to those according to the other embodiments. The position adjusting unit 128 adjusts a print position based on the correction coefficients calculated by the correction-coefficient calculating unit 106 when a print medium is delivered from either one of the first paper-feeding tray 24 and the second paper-feeding tray 25.

FIG. 24 is a flowchart of image processing performed by the image processing system 2. The server 20 transmits print data to the MFP 23 (step S200). The MFP 23 outputs the print data onto a print medium delivered from the first paper-feeding tray 24 to obtain a first print (step S202). Here, as a precondition, for an output of the print data onto the delivered print medium from the MFP 23, a print position is set in advance so as to be an appropriate position. Then, the print data is actually printed onto a print medium as preprinted paper. Based on the print result, the operator performs fine adjustment by trial and error with the settings of the MFP.

Next, the MFP 23 outputs the print data onto a print medium delivered from the second paper-feeding tray 25 to obtain a second print (step S204). The first print and the second print are read by the scanner (step S206). The prints are mounted on the scanner with caution so that the setting position of the first print matches the setting position of the second print. For example, sheets of paper are aligned with an edge of a table of the scanner.

Next, a print-position adjusting process is performed based on a first print image obtained by digitizing the first print and a second print image obtained by digitizing the second print (step S208). The image processing is thus completed.

FIG. 25 is a detailed flowchart of the print-position adjusting process shown in FIG. 24. First, the binarizing unit 102 binarizes the first print image and the second print image (step S220). Next, the correction-coefficient calculating unit 106 calculates correction coefficients based on the first print image and the second print image (step S222). Next, the position adjusting unit 128 adjusts the print position for the second print medium according to the settings of the MFP (step S224). The print-position adjusting process is thus completed.

As explained above, in the image processing system 2 according to the fifth embodiment, the operator adjusts the print position by trial and error for the first tray, whilst the print position can be adjusted for the second tray based on the correction coefficients. With this, an efficient adjusting process can be achieved.

The configuration and processes other than those explained above in the image processing system 2 according to the fifth embodiment are similar to the configuration and processes in the image processing system according to any of the other embodiments.

Figure 26:
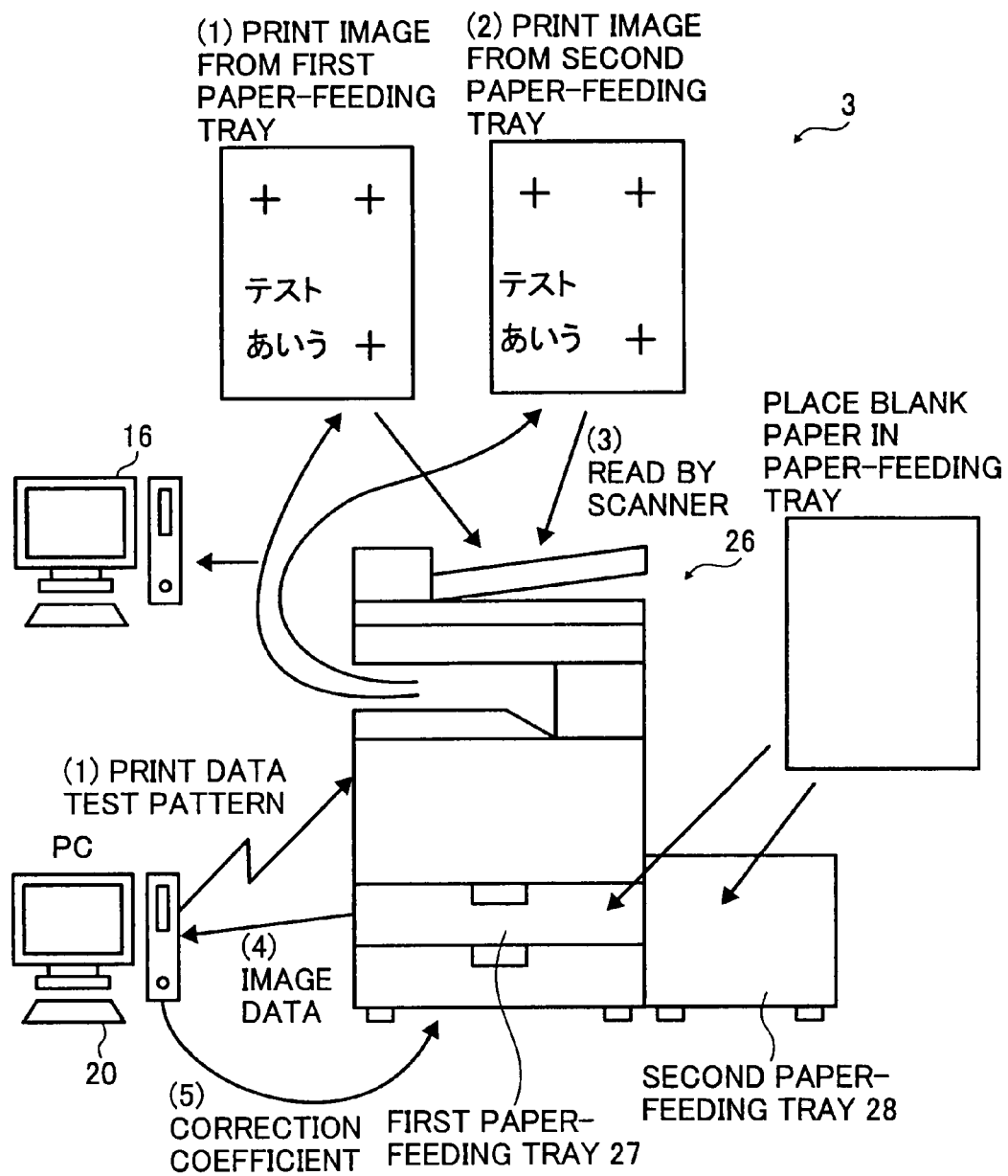
FIG. 26 is a schematic of an image processing system according to a sixth embodiment of the present invention.

FIG. 26 is a schematic of an image processing system 3 according to a sixth embodiment of the present invention. The image processing system 3 includes the server 20, an image processing apparatus 16, and an MFP 26. The MFP 26 has a scanner function and a printer function. As with the MFP 23, the MFP 26 prints print data on a print medium delivered from a first paper-feeding tray 27 to obtain a first print, and prints the print data on a print medium delivered from a second paper-feeding tray 28 to obtain a second print. Then, the first print and the second print are read by a scanner to obtain a first print image and a second print image.

The image processing apparatus 16 obtains the first print image and the second print image from the MFP 26. Then, based on the first print image and the second print image, an adjustment amount for adjusting the print position for printing onto the print medium delivered from the second paper-feeding tray 28 is calculated and output. That is, part of the function performed by the MFP 23 according to the fifth embodiment is performed by the image processing apparatus 16.

Figure 27:
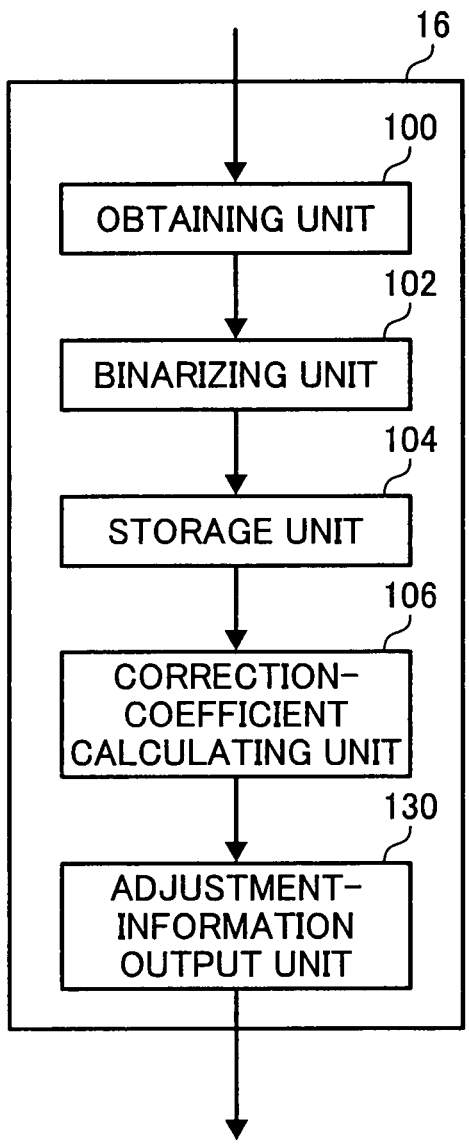
FIG. 27 is a functional block diagram of an image processing apparatus shown in FIG. 26.

FIG. 27 is a functional block diagram of the image processing apparatus 16 according to the sixth embodiment. The image processing apparatus 16 includes the obtaining unit 100, the binarizing unit 102, the storage unit 104, the correction-coefficient calculating unit 106, and an adjustment-information output unit 130. The adjustment-information output unit 130 calculates an adjustment amount from the correction coefficients calculated by the correction-coefficient calculating unit 106 to output print position adjustment information including the adjustment amount. The display 12 displays the print position adjustment information output from the adjustment-information output unit 130. Specifically, on the display 12, image IDs of the first print image and the second print image to be processed and the print position adjustment amount calculated from these images are displayed.

The operator refers to this display to set the displayed print position adjustment amount to the MFP 26, thereby adjusting the position when printing onto the print medium delivered from the second paper-feeding tray 28.

The configuration and processes other than those explained above in the image processing system 3 according to the sixth embodiment are similar to the configuration and processes in the image processing system according to any of the other embodiments.

Figure 28:
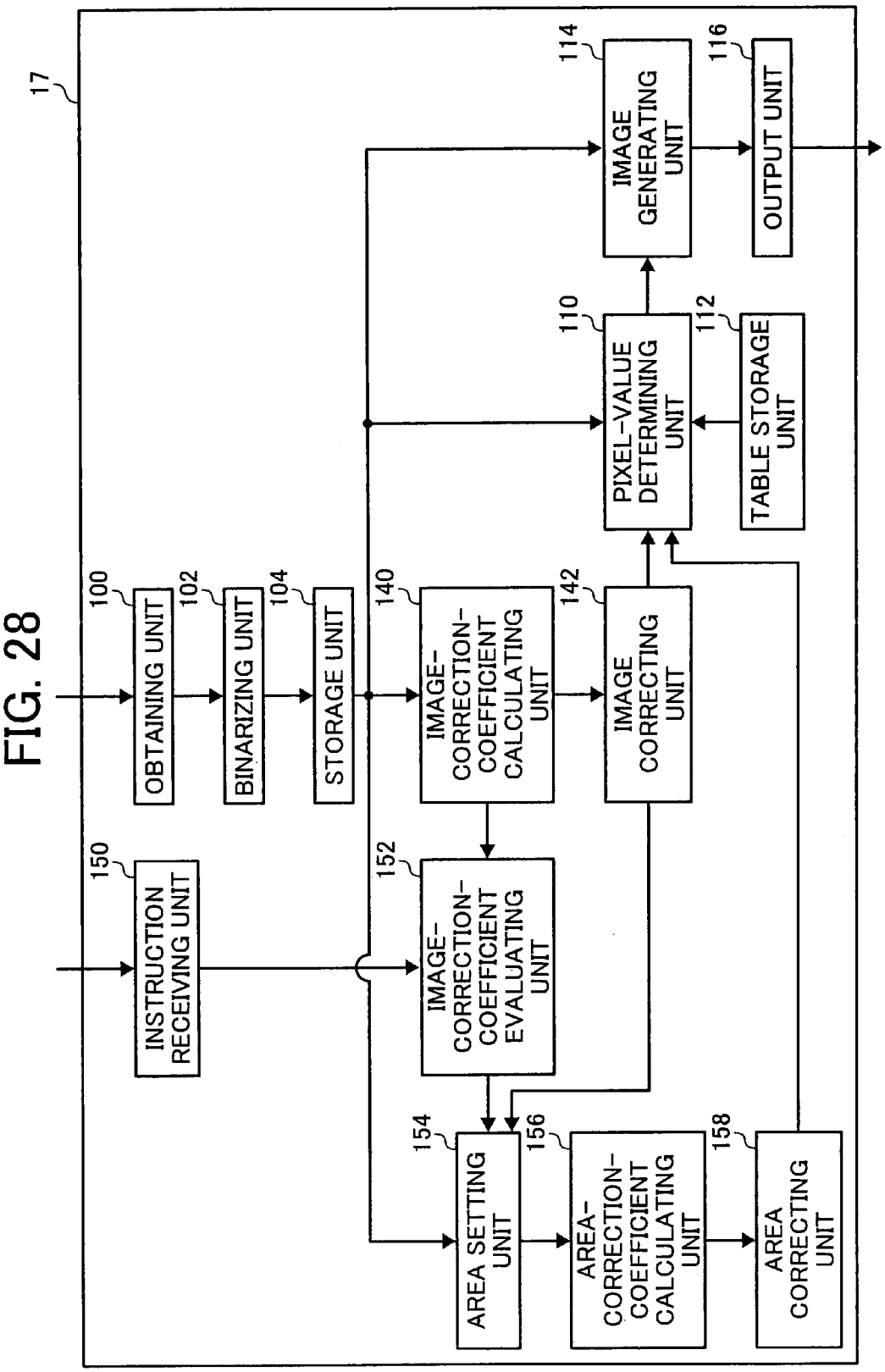
FIG. 28 is a functional block diagram of an image processing apparatus in an image processing system according to a seventh embodiment of the present invention.

FIG. 28 is a functional block diagram of an image processing apparatus 17 in an image processing system according to a seventh embodiment of the present invention. The image processing apparatus 17 calculates, in addition to the image correction coefficients, which are correction coefficients for the entire image, area correction coefficients, which are local correction coefficients for partial areas in an image. Then, based on such area correction coefficients, the partial area is corrected.

The image processing apparatus 17 includes the obtaining unit 100, the binarizing unit 102, the storage unit 104, the pixel-value determining unit 110, the table storage unit 112, the image generating unit 114, and the output unit 116, as well as an image-correction-coefficient calculating unit 140, an image correcting unit 142, an instruction receiving unit 150, an image-correction-coefficient evaluating unit 152, an area setting unit 154, an area-correction-coefficient calculating unit 156, and an area correcting unit 158.

The image-correction-coefficient calculating unit 140 and the image correcting unit 142 correspond to the correction-coefficient calculating unit 106 and the correcting unit 108, respectively, according to any of the other embodiments. That is, the image-correction-coefficient calculating unit 140 calculates image correction coefficients, which are correction coefficients for the entire image. Here, the image correction coefficients correspond to correction coefficients according to any of the other embodiments. The image correcting unit 142 corrects either one of the first print image and the second print image based on the image correction coefficients. Here, the first print image is corrected in the embodiment.

Figure 29:
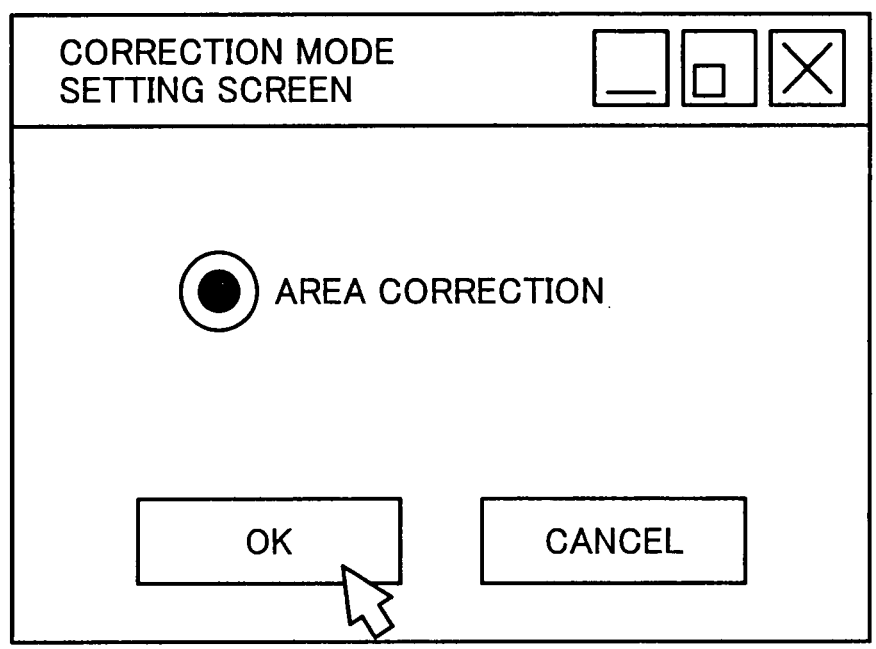
FIG. 29 is an example of a setting screen.

The instruction receiving unit 150 receives from an operator an area correction instruction. The area correction instruction is an instruction for correction not for the entire image but by units of a predetermined area in the image. For example, if the image processing apparatus 17 includes a widow system, a setting screen as shown in FIG. 29 is presented to the operator. Then, an instruction of whether an area correction is to be performed is received from the operator.

When the instruction receiving unit 150 receives an area correction instruction, the image-correction-coefficient evaluating unit 152 evaluates the image correction coefficients calculated by the image-correction-coefficient calculating unit 140. This is to determine whether the first print image can be corrected with a sufficient accuracy only with the image correction coefficients.

In some cases, not only the entire image has been expanded or contracted, or rotated, but also a local distortion has occurred. Although a slight distortion is unavoidable due to the condition of a paper-feeding device at the time of image pickup by the scanner, such a subtle distortion does not pose a problem. Although a large local distortion may pose a problem as misalignment, if a portion with such a subtle distortion is displayed as misalignment, a misalignment area to be primarily handled becomes inconspicuous. To get around this, such a subtle local distortion is corrected in advance.

The image-correction-coefficient evaluating unit 152 compares the first print image after image correction with the image correction coefficients and corresponding pixel values of the second print image, and when the number of matching pixels is equal to or larger than a predetermined threshold, determines that the positions of the images become matched through image correction.

The area setting unit 154 sets first areas, which are areas in the first print image after image correction. Specifically, the first print image is divided into rectangular areas each having a preset size. A plurality of areas obtained through this division are each set as a first area.

The area-correction-coefficient calculating unit 156 specifies a second area from the second print image corresponding to an arbitrary first area obtained by the area setting unit 154. Then, an area correction coefficient, which is a correction coefficient between the first area and the second area, is calculated.

Specifically, an area in the second print image that is possibly a second area is first set as a second area candidate. The second area candidate is an arbitrary area having the same size and shape as those of the first area. The position of the second area candidate in the second print image is set near the position of the first area in the first print image. Furthermore, by shifting by one pixel from the position corresponding to the first area, a plurality of second area candidates is set.

Here, a setting range of the second area candidates is defined as being within a predetermined distance from a reference point, which is, for example, the position corresponding to the first area. In this manner, the range searched for second area candidates is set in advance.

Further, the area-correction-coefficient calculating unit 156 calculates a degree of difference between each of the second area candidates and the first area. Specifically, the number of pixels that do not match in a binary image is calculated as a degree of difference. A second area candidate with the smallest degree of difference is determined as a second area corresponding to the first area. Here, for evaluation in a multi-valued image, an accumulated value of absolute values of corresponding pixel values may be calculated as a degree of difference.

Here, when setting second area candidates, misalignment due to distortion, such as expansion or contraction, rotation, or others, may be considered. Specifically, a degree of difference between the first area expanded or contracted or rotated, for example, and the second area candidate may be calculated.

The area-correction-coefficient calculating unit 156 calculates a correction coefficient between thus determined second area and the first area as an area correction coefficient. The area correcting unit 158 corrects the area in the corrected first print image based on the area correction coefficient calculated by the area-correction-coefficient calculating unit 156. When the area correcting unit 158 performs correction, the pixel-value determining unit 110 determines a pixel value based on the first print image after the correction by the area correcting unit 158 and the second print image.

Figure 30B:
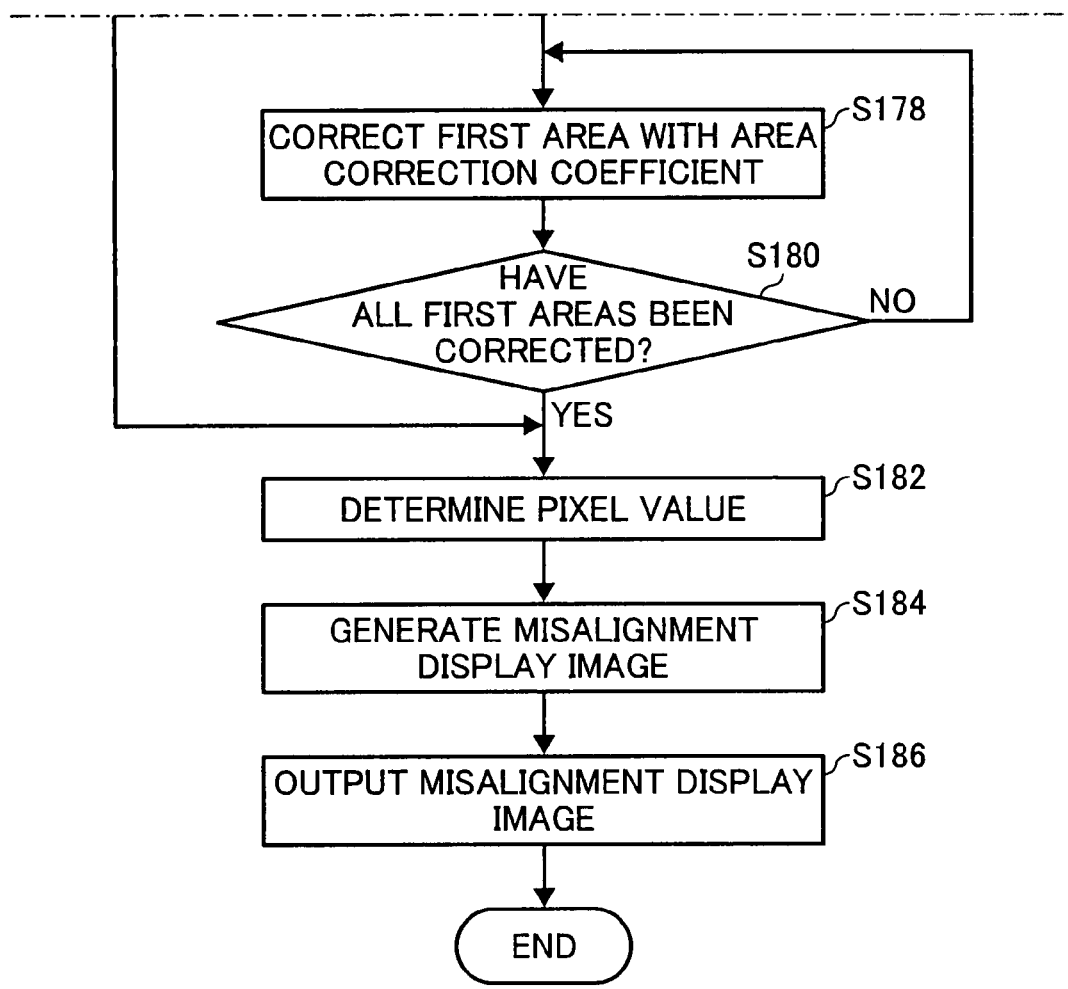
FIG. 30 is a flowchart of a misalignment display process according to the seventh embodiment.

FIG. 30 is a flowchart of a misalignment display process performed by the image processing apparatus 17. First, the binarizing unit 102 binarizes the first print image and the second print image (step S160). Next, the image-correction-coefficient calculating unit 140 calculates correction coefficients, i.e., image correction coefficients, for the first print image and the second print image after binarization (step S162). The image correcting unit 142 corrects the first print image by using the image correction coefficient (step S164). That is, image correction is performed.

When the instruction receiving unit 150 has received an area correction instruction from the operator (Yes at step S166), the image-correction-coefficient evaluating unit 152 evaluates the image correction coefficients calculated by the image correcting unit 142 (step S168).

If the image-correction-coefficient evaluating unit 152 determines based on the evaluation result that the first print image after image correction and the second print image match (Yes at step S170), the area setting unit 154 sets areas (step S172). For example, as shown in FIG. 31, four areas obtained by dividing the first print image into four are set as first areas. In this case, areas of the second print image that correspond to the respective first areas are further set as second area candidates. Still further, based on the degree of difference, a second area corresponding to each first area is set.

Next, the area-correction-coefficient calculating unit 156 calculates a correction coefficient between an arbitrary first area set by the area setting unit 154 and its corresponding second area, that is, an area correction coefficient (step S174). This process is performed for every first area. Upon completion of calculating area correction coefficients for all of the first areas (Yes at step S176), the area correcting unit 158 uses each area correction coefficient to correct the corresponding first area (step S178). In the example of FIG. 31, if area correction coefficients have been calculated for all of the four first areas (Yes at step S176), the process control proceeds to step S178.

If area correction has been completed for all first areas, that is, four first areas (Yes at step S180), the pixel-value determining unit 110 determines a pixel value based on the first print image after area correction and the second print image (step S182). Next, the image generating unit 114 generates a misalignment display image based on the pixel value determined by the pixel-value determining unit 110 (step S184). Next, the output unit 116 outputs the misalignment display image (step S186). The process is thus completed.

FIG. 32 is a schematic of a first print image after image correction, a second print image, and a misalignment display image generated therefrom. In an example shown in FIG. 32, it is assumed that a character "B" on the right side of the first print image after image correction matches that of the second print image but a character "A" on the left side of the first print image after image correction does not match that of the second print image. In this case, if the entire image is tried to be corrected for correcting misalignment of the character "A", the character "B", which does not require correction, has to be corrected, thereby causing misalignment of the character "B". In such a case, area correction is performed, thereby correcting only the misalignment of the character "A".

Figure 33:
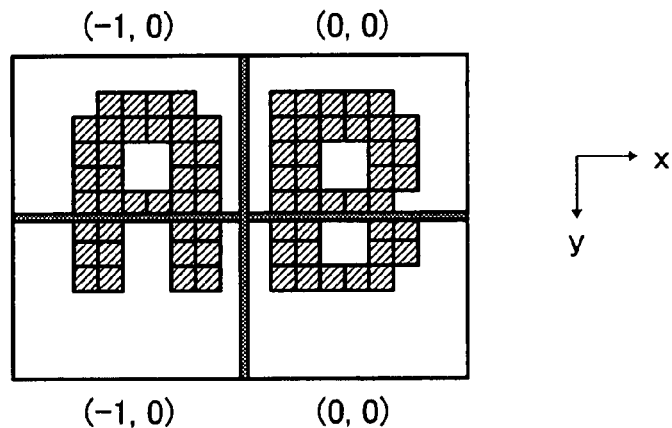
FIG. 33 is schematic of a first area.
Figure 34:
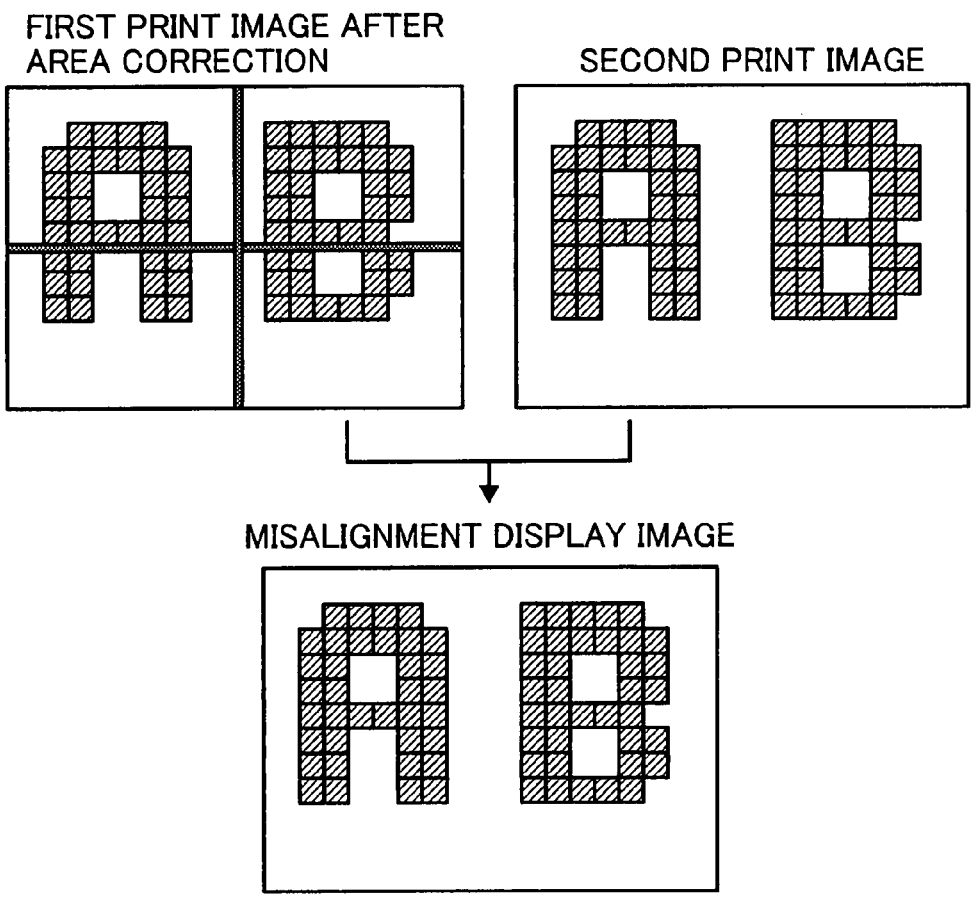
FIG. 34 is a schematic of a first print image after area correction, a second print image, and a misalignment display image generated therefrom.

Specifically, as shown in FIG. 3, the first print image after image correction is divided into four, and an area correction coefficient is calculated for each first area. Based on the area correction coefficient, the first area is corrected. In an example shown in FIG. 33, two first areas on the left side are shifted to the left side (in a minus x direction) by one pixel. FIG. 34 is a schematic of a first print image after shifting, i.e., a first print image after area correction, a second print image, and a misalignment display image generated therefrom. As shown in FIG. 34, the first print image is subjected to not only image correction but also area correction, thereby matching the character positions of "A" and "B". This can eliminate an unnecessary misalignment due to a local distortion, thereby providing the operator with a misalignment display image with only the portion having a significant difference in the print result being displayed in a visually-inspectable form.

The configuration and processes other than those explained above in the image processing system according to the seventh embodiment are similar to the configuration and processes in the image processing system according to any of the other embodiments.

While, in the seventh embodiment, rectangles defined from the first print image after image correction are set as first areas, a sequence of black pixel components can be found from the first print image after image correction, and these black pixel components can be set as areas. In another example, a rectangle circumscribing the black pixel components can be set as an area. In this case, area correction can be performed only on the obtained first area.

In the seventh embodiment, area correction is performed after image correction. However, image correction can be skipped when area correction is performed. In the case where it is known in advance that no distortion due to a factor affecting the entire image has occurred, area correction is performed in the same manner as explained above to present an appropriate misalignment display image to an operator.

Figure 35:
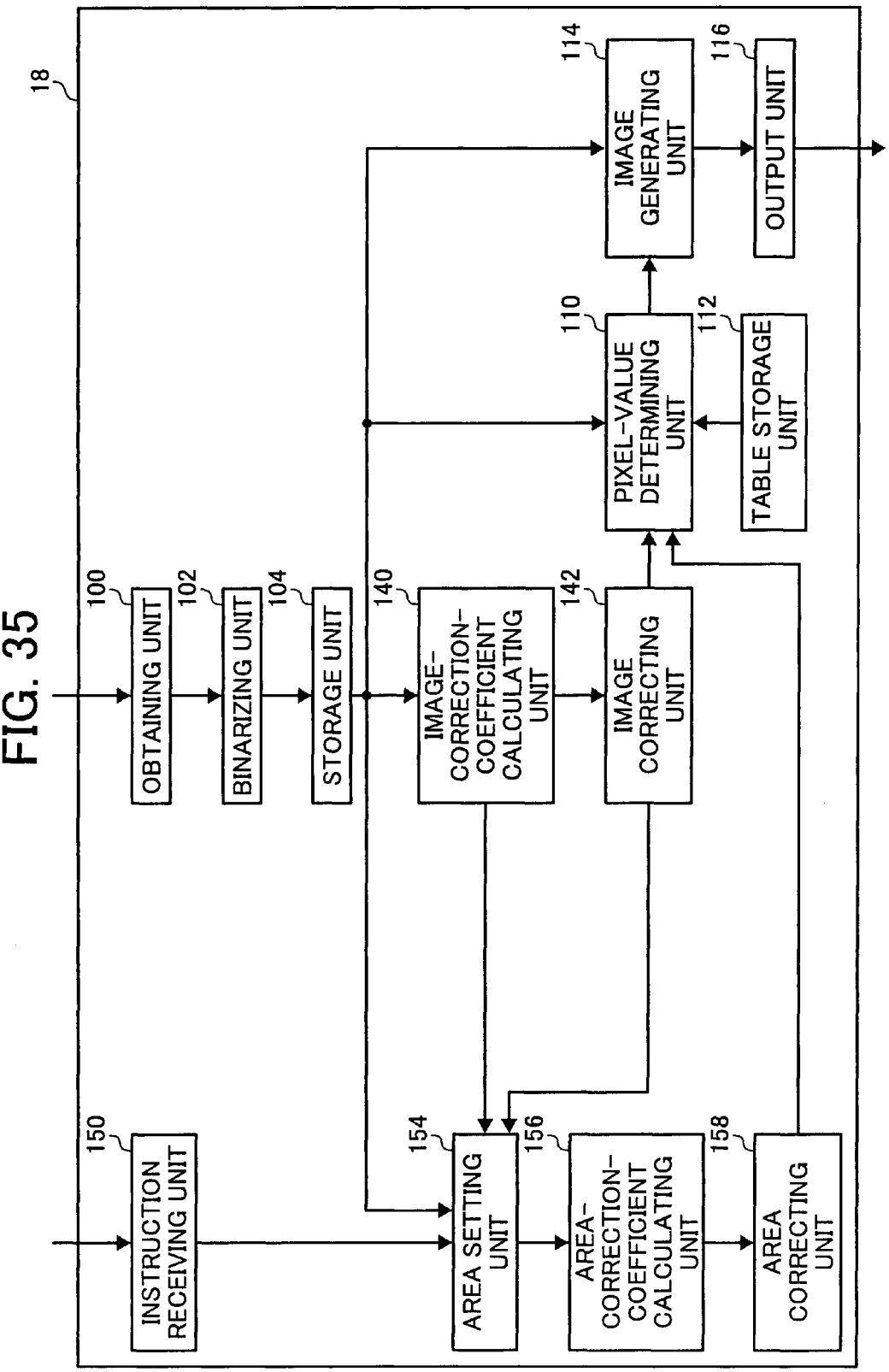
FIG. 35 is a functional block diagram of an image processing apparatus in an image processing system according to an eighth embodiment of the present invention.

FIG. 35 is a functional block diagram of an image processing apparatus 18 in an image processing system according to an eighth embodiment of the present invention. The image processing apparatus 18 is basically similar in functional configuration to the image processing apparatus 17 except that it does not include an image-correction-coefficient evaluating unit. The image processing apparatus 18 once generates and outputs a misalignment display image from the first print image after image correction and the second print image. Then, when an area correcting instruction is issued from the operator at this time, according to this instruction, area correction is performed on the first print image after image correction. Then, a misalignment display image is generated from the first print image after area correction and the second print image for output.

Figure 36:
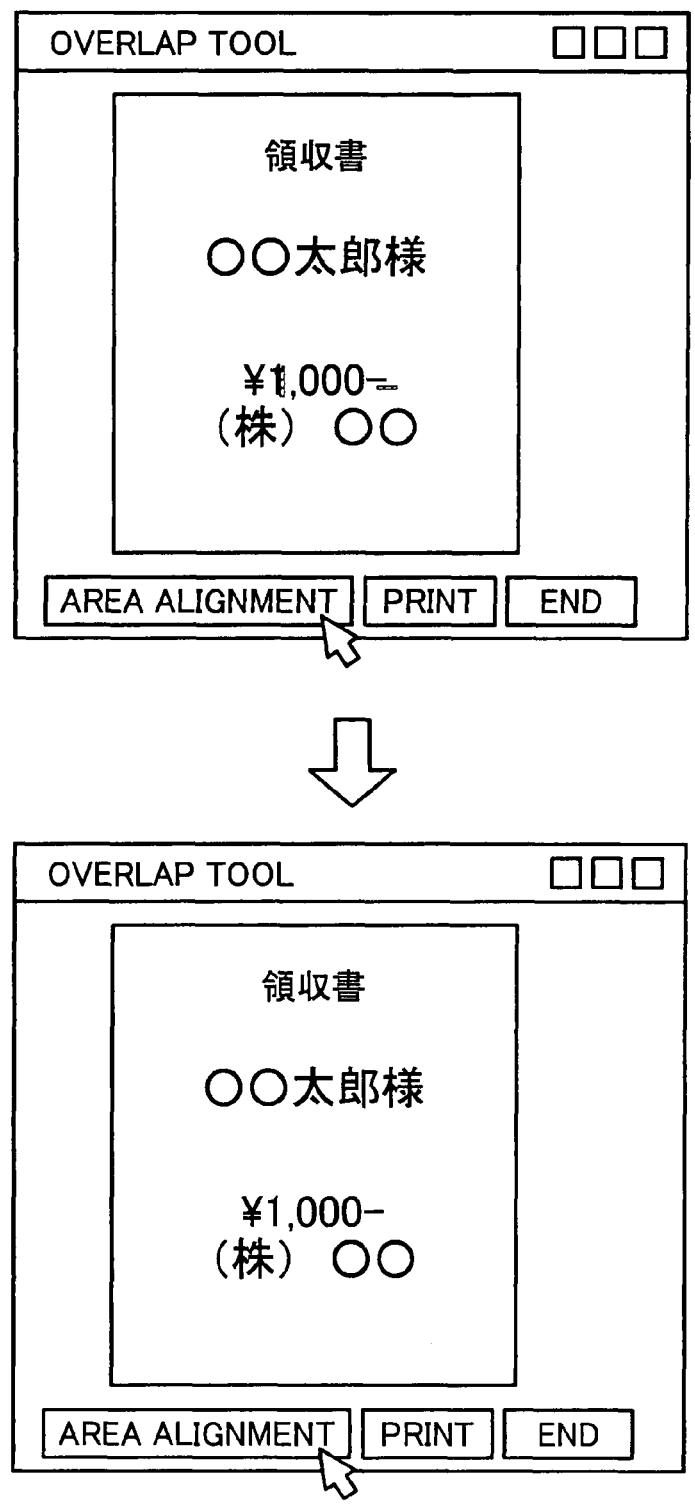
FIG. 36 is an example of a setting screen.

For example, as shown in FIG. 36, a "perform area alignment" button is displayed together with the misalignment display image generated from the first print image after image correction and the second print image. When the operator selects the "perform area alignment" button, the instruction receiving unit 150 receives an area correction instruction.

Figure 37B:
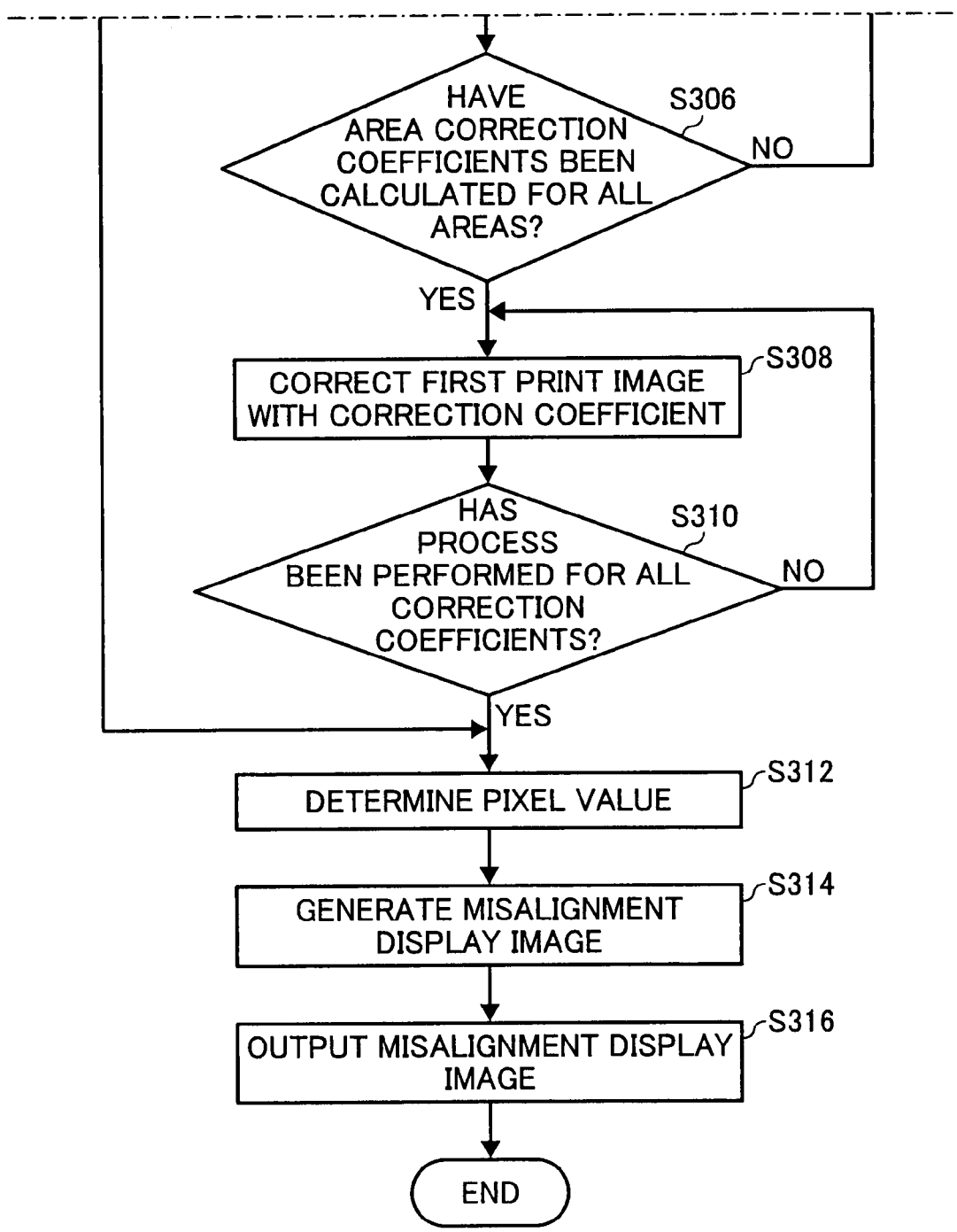
FIG. 37 is a flowchart of a misalignment display process according to the eighth embodiment.

FIG. 37 is a flowchart of a misalignment display process performed by the image processing apparatus 18. Processes from steps S120 to S130 are similar to those in the misalignment display process performed by the image processing apparatus 10, that is, those from steps S120 to S130 shown in FIG. 5.

After the misalignment display image is output, when the instruction receiving unit 150 receives an area correction instruction from the operator (Yes at step S300), the area setting unit 154 sets first areas and second areas (step S302). Next, the area-correction-coefficient calculating unit 156 calculates an area correction coefficient for each first area (steps S304 and S306). Then, the area-correction-coefficient calculating unit 156 performs area correction (steps S308 and S310). Then, a misalignment display image after area correction is generated (steps S312 to S316). Here, the processes from steps S302 to S316 are similar to steps S172 to S186, respectively, according to the seventh embodiment explained with reference to FIG. 31.

Here, the configuration and processes other than those explained above in the image processing system according to the eighth embodiment are similar to the configuration and processes in the image processing system according to any of the other embodiments.

As has been explained in the foregoing, the image system according to the embodiments, for a change in output settings due to replacement of printers or others, the settings can be simplified, and customer convenience can be improved.

As set forth hereinabove, according to an embodiment of the present invention, by visually inspecting a misalignment display image, an operator can easily find a difference between images while checking the degree of the difference.

Moreover, a subtle, local distortion is not displayed as misalignment, and only a noteworthy difference between the images can be easily found in the misalignment display image.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A misalignment detecting apparatus that detects misalignment of a second image with respect to a first image, the misalignment detecting apparatus comprising:
    a digitizing unit that digitizes images to obtain the first image and the second image;
    a line-width changing unit that increases a width of a line in any one of the first image and the second image;
    an image generating unit that generates a third image indicating misalignment between the first image and the second image in a preset manner based on misalignment between corresponding points on the first image and the second image, in one of which the width of the line has been changed; and
    an output unit that visually outputs the third image.

2. The misalignment detecting apparatus according to claim 1, wherein the third image comprises: a first portion in an area where a black image area in the first image and a white image area in the second image overlap; and a second portion in an area where a white image area in the first image and a black image area in the second image overlap, and wherein the image generating unit assigns pixel values different from each other to the first portion of the third image and the second portion of the third image.

3. The misalignment detecting apparatus according to claim 1, further comprising a difference calculating unit that calculates a degree of difference between the first image and the second image, wherein the output unit outputs the third image when the degree of difference exceeds a predetermined threshold.

4. The misalignment detecting apparatus according to claim 3, wherein the difference calculating unit calculates the degree of difference based on a shape of an image included in the first image and the second image.

5. The misalignment detecting apparatus according to claim 1, wherein the digitizing unit digitizes a first print obtained by printing data on a print medium held by a first medium holding unit to obtain the first image, and a second print obtained by printing data on a print medium held by a second medium holding unit to obtain the second image, and the image generating unit generates the third image based on the first image and the second image.

6. The misalignment detecting apparatus according to claim 1, further comprising an instruction receiving unit that receives an instruction for area correction, wherein an area-correction-coefficient calculating unit calculates an area correction coefficient when the instruction receiving unit receives the instruction.

7. The misalignment detecting apparatus according to claim 1, further comprising: an image-correction-coefficient calculating unit that calculates an image correction coefficient between the first image and the second image based on the misalignment between the corresponding points on the first image and the second image; an image correcting unit that corrects the first image based on the image correction coefficient to obtain corrected first image; an area-correction-coefficient calculating unit that calculates, based on misalignment between corresponding points in a first area of the first image and a second area of the second image that corresponds to the first area, an area correction coefficient between the first area and the second area when a degree of difference between the corrected first image and the second image is equal to or less than a predetermined threshold; and an area correcting unit that corrects the first area based on the area correction coefficient to obtain corrected first area, wherein the image generating unit generates the third image in a predetermined manner based on misalignment between the corresponding points in the corrected first area and the second area.

8. A misalignment detecting method for detecting misalignment of a second image with respect to a first image, the misalignment detecting method comprising:
    digitizing images to obtain the first image and the second image;
    causing a line-width changing unit to increase a width of a line in any one of the first image and the second image;
    causing an image generating unit to generate a third image indicating misalignment between the first image and the second image in a preset manner based on misalignment between corresponding points on the first image and the second image, in one of which the width of the line has been changed; and
    outputting visually the third image.

9. A computer program product comprising a non-transitory computer readable medium having computer readable program codes embodied in the medium that when executed causes a computer to execute:
    digitizing images to obtain the first image and the second image;
    causing a line-width changing unit to increase a width of a line in any one of the first image and the second image;
    causing an image generating unit to generate a third image indicating misalignment between the first image and the second image in a preset manner based on misalignment between corresponding points on the first image and the second image, in one of which the width of the line has been changed; and
    visually outputting the third image.

10. The misalignment detecting apparatus according to claim 1, further comprising: an image-correction-coefficient calculating unit that calculates an image correction coefficient based on a misalignment between corresponding points on the first image and the second image; and an image correcting unit that corrects the first image based on the image correction coefficient to obtain a corrected first image.

11. The misalignment detecting method according to claim 8, further comprising: calculating an image-correction-coefficient based on a misalignment between corresponding points on the first image and the second image; and correcting the first image based on the image correction coefficient to obtain a corrected first image.

12. The misalignment detecting method according to claim 8, further comprising calculating a degree of difference between the first image and the second image, wherein the outputting includes outputting the third image when the degree of difference exceeds a predetermined threshold.

* * * * *